United States Patent [19]
Hossain et al.

[11] Patent Number: 5,581,749
[45] Date of Patent: Dec. 3, 1996

[54] SYSTEM AND METHOD FOR MAINTAINING CODES AMONG DISTRIBUTED DATABASES USING A GLOBAL DATABASE

[75] Inventors: K. Omar Hossain, Midland; James J. Whyte, Mount Pleasant, both of Mich.

[73] Assignee: TheDow Chemical Company, Midland, Mich.

[21] Appl. No.: 993,573

[22] Filed: Dec. 21, 1992

[51] Int. Cl.[6] .................................................. G06F 17/30
[52] U.S. Cl. .................. 395/600; 364/226.3; 364/282.4; 364/DIG. 1; 395/200.03; 395/201; 395/228
[58] Field of Search ................................... 395/600, 200, 395/700, 650, 200.03; 364/403, 468, 478, 489, 401, 226.3, 282.4

[56] References Cited

U.S. PATENT DOCUMENTS

| | | | |
|---|---|---|---|
| 4,432,057 | 2/1984 | Daniell et al. | 395/600 |
| 4,714,992 | 12/1987 | Gladney et al. | 395/600 |
| 4,868,866 | 9/1989 | Williams, Jr. | 380/49 |
| 4,881,166 | 11/1989 | Thompson et al. | 395/600 |
| 4,945,474 | 7/1990 | Elliot et al. | 395/575 |
| 5,058,000 | 10/1991 | Cox et al. | 395/600 |
| 5,093,911 | 3/1992 | Parks et al. | 395/600 |
| 5,136,707 | 8/1992 | Block et al. | 395/600 |
| 5,216,612 | 6/1993 | Cornett et al. | 364/468 |
| 5,230,073 | 7/1993 | Gausmann et al. | 395/600 |
| 5,231,566 | 7/1993 | Blutinger et al. | 364/401 |
| 5,261,102 | 11/1993 | Hoffman | 395/700 |
| 5,333,316 | 7/1994 | Champagne et al. | 395/600 |
| 5,361,199 | 11/1994 | Shoquist et al. | 364/401 |
| 5,418,945 | 5/1995 | Carter et al. | 395/600 |

OTHER PUBLICATIONS

Maryanski, Compcon 85, "Multi–Copy Workstation Databases", Feb. 1985, pp. 50–53.
Sang Hyuk Son, IEEE Computer Society Office Automation Symposium, "A Synchronization Scheme for Replicated Data in Distributed Information Systems", Apr. 1987, pp. 171–177.
Norman et al, National Computer Conference "Empact: A Distributed Database Application", May 1983, pp. 203–217.
Thompson, Computer Technology Review vol. 9, No. 10, "Migration Between Environments Made Easy With RPC", Aug. 1989, pp. 21–22.
Stumm et al. "Algorithms Implementing Distributed Shared Memory," *Computer*, May 1990, pp. 54–64.

Primary Examiner—Thomas G. Black
Assistant Examiner—Hosain T. Alam
Attorney, Agent, or Firm—Sterne, Kessler, Goldstein and Fox

[57] ABSTRACT

A global code system maintains reference records for multiple transaction processing systems on a central database (called a global code database). A client (i.e., a user or an external application) cannot directly create reference records on a transaction processing system. Instead, the client must request the global codes system to create a reference record. The global code system responds, in real time, by adding the record to the global codes database and by distributing the record to one or more transaction processing systems in real time. Similarly, the client cannot directly update or delete reference records on the transaction processing system. Instead, the client must request the global code system to update or delete the reference record. The global code system responds, in real time, by updating or deleting the reference record on the global codes database and by distributing the update or deletion to the transaction processing systems which had been instructed to create the record. In addition to distributing record creations, updates and deletions to the transaction processing systems, the global code system distributes these operations to one or more shadow code systems. Each shadow code system provides a copy of a subset of the reference records for read-only access by remote application programs.

49 Claims, 30 Drawing Sheets

| Customer code | 001 | — 302 |
| Customer name | Acme Corp. | — 324 |
| Purchasing address | Purchasing Department<br>101 Industrial Parkway<br>Formertown, Formerstate 10010<br>Anynation | — 316 |
| Purchasing contact | William Buyer<br>111-555-6666 | |

| Customer code | AAB | —304 |
|---|---|---|
| Customer name | Acme | —326 |
| Accounting address | Accounting Department<br>102 Industrial Parkway<br>Formertown, Formerstate 10010<br>Anynation | —318 |
| Accounting contact | Pricilla Bookkeeper<br>111-555-7777 | |

| Customer code | qrs | —306 |
|---|---|---|
| Customer name | Acme Company | —328 |
| Receiving address | Purchasing Department<br>103 Industrial Parkway<br>Formertown, Formerstate 10010<br>Anynation | —320 |
| Receiving contact | Lode N. Doc<br>111-555-8888 | |

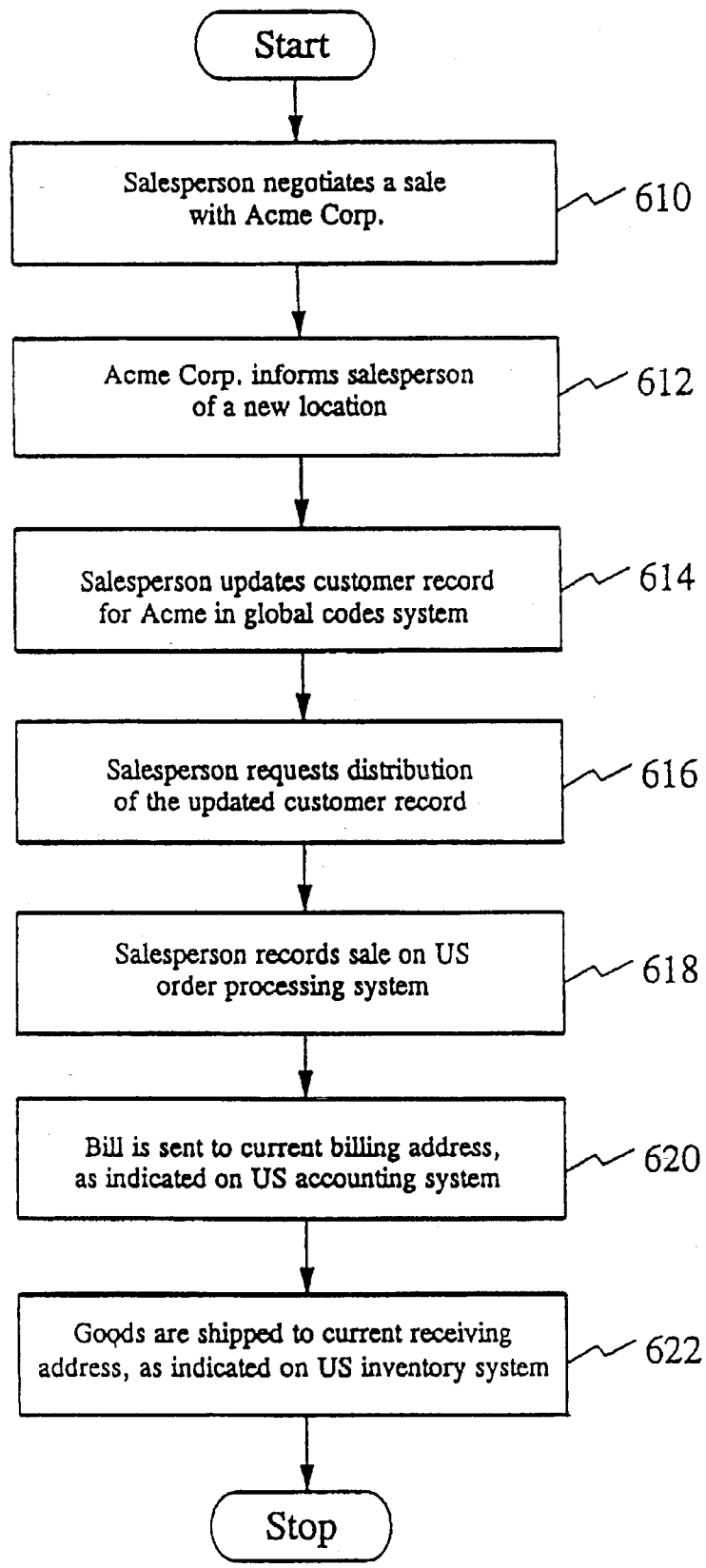

FIG. 7

| | | |
|---|---|---|
| Customer code | 001 | 711 |
| Customer name | Acme Corp. | 712 |
| Headquarters address | Corporate Headquarters<br>20 Corporate Center Drive<br>Anytown, Anystate 01101<br>Anynation | 714 |
| Purchasing address | Purchasing Department<br>23 Corporate Center Drive<br>Anytown, Anystate 01101<br>Anynation | 716 |
| Accounting address | Accounting Department<br>24 Corporate Center Drive<br>Anytown, Anystate 01101<br>Anynation | 718 |
| Receiving address | Receiving Department<br>25 Corporate Center Drive<br>Anytown, Anystate 01101<br>Anynation | 720 |
| Headquarters contact | Charles E. Acme<br>222-333-1111 | 722 |
| Purchasing contact | William Buyer<br>222-333-4444 | 724 |
| Accounting contact | Pricilla Bookkeeper<br>222-333-5555 | 726 |
| Receiving contact | Lode N. Doc<br>222-333-6666 | 728 |

710

SYSTEM AND METHOD FOR MAINTAINING CODES AMONG DISTRIBUTED DATABASES USING A GLOBAL DATABASE

BACKGROUND OF THE INVENTION

1. Field of the Invention

The present invention relates generally to a distributed database, and more particularly, to a system and method for integrating multiple transaction processing systems and maintaining consistency of codes used therein.

2. Related Art

Businesses perform a variety of time consuming administrative functions. These generally include order processing, inventory control, accounting, manufacturing control, and personnel recordkeeping. Such functions can become quite arduous for large companies. As technology has evolved, computerized database management systems have become available to automate these processes. Such database management systems are also known as "transaction processing systems".

A database management system is a set of software programs that controls the organization, storage and retrieval of data (also called codes) in a database. The database management system handles the repetitive tasks involved with data processing so that a user is free to perform higher level functions.

A database stores data as a collection of related files. Each file contains a collection of related logical records, and each logical record contains a collection of related fields. A logical record may be made up of multiple physical records. That is, a field of a logical record may either be a value or another record. In the latter circumstance, the record having such a field is said to be a base record, and the record which constitutes the field is a support record of the base record.

Because a database management system uses a number of rules to process the data which it manages, the database management system also controls the security and integrity of the dam. When data corruption or ambiguity occurs, it most often results from operator (human) error. Such ambiguity is particularly prevalent between multiple transaction processing systems. This is explained in detail below.

As computer technology has advanced in the last twenty years, businesses have generally automated their administrative functions in a piecemeal fashion. For example, a transaction processing system would be purchased to automate an accounting department. Next, a transaction processing system would be purchased to automate inventory control. Finally, a transaction processing system would be installed to handle order processing. This type of bottom-up (rather than top-down) computerization often resulted in a number of independent systems which are unable to effectively communicate or share data.

Accordingly, any communication between the different transaction systems requires operator intervention. For example, if a new product is added into the order entry system, it must also be manually entered into the accounting system, otherwise a bill could not be prepared on the accounting system. Many problems result from this lack of communication/data sharing between the various transaction processing systems.

First, the integrity of data between the different transaction processing systems cannot be ensured. For example, if a product code PC101 is used to represent product X in the order processing system and a product code P101 is used to represent the same product in the inventory control system, then attempts to share data between the two systems will cause errors. It is not clear whether PC 101 and P 101 represent the same or different products. Similarly, it is difficult to determine whether a customer entered into the accounting system as John Doe and into the order entry system as J. Doe Company are the same or distinct entities.

A second deficiency of the conventional transaction processing environment is the lack of data currency. Conventional systems do not communicate with one another in an on-line manner (i.e., in real time). Rather, they are periodically (e.g., nightly) reconciled with one another. Consequently, the different systems in the transaction processing environment may simultaneously store different values for data that they supposedly share. For example, suppose records on both an inventory system and an order processing system indicated that 3000 units of a particular product are available. A transfer of 2500 of the units to a company subsidiary is then entered on the inventory system. The inventory system would then indicate that 500 units were available. However, until the next reconciliation between the systems, the order processing system would continue to indicate an availability of 3000 units. This could mislead a user of the order processing system to believe that 3000 units of the product remain in stock.

The lack of data integrity and data currency can result in a number of business problems. For example, it is possible for a user to promise delivery of a product which is not in stock, to deliver a product to a customer with a delinquent payment history, to ship an incorrect product, to bill an incorrect location, etcetera. Each of these errors are highly undesirable. However, they frequently occur in conventional transaction processing environments.

A third deficiency of the conventional transaction processing environment is the lack of standard user interfaces. That is, a user of an accounting system may not be able to use the order entry or inventory systems. If a person is required to use multiple transaction processing systems, then he or she must learn the user interface of each. This increases the training requirements for system users.

Similarly, the conventional transaction processing environment lacks standard application interfaces. That is, each transaction processing system must have a distinct interface to every other transaction processing system from which it receives data. Moreover, the lack of standard interfaces impedes maintainability of the transaction processing systems, as modifying the physical structure of a record in one transaction processing system necessitates modifying the application interface of every other transaction processing system which accesses that record.

A fourth deficiency of the conventional transaction processing environment is that the structure of the environment limits the number of data views. Specifically, the environment cannot present a view which combines data from records on distinct transaction processing systems. For example, if the inventory system maintained records on production cost only on a per product basis and the accounting system maintained records on revenues only on a per product basis, the conventional transaction processing environment could not consult both systems to present a view of profits per product.

What is needed is a maintainable transaction processing system which ensures the integrity and currency of data; which has consistent user and application interfaces; and which can present multiple data views.

SUMMARY OF THE INVENTION

The present invention is a database management system, called a "global code system", which coordinates the code maintenance (i.e., sharing of data) between transaction processing systems. All requests to modify (i.e., create, update or delete) data in the transaction processing environment of the present invention are made through the global code system.

The global code system processes these requests by performing the modification on a global code database and by directing each transaction processing system which uses the modified data to perform the same modification. This is done in real time. Thus, the global code database maintains a current copy of each record stored in any transaction processing database. This controlled data redundancy ensures both data accuracy and data currency.

In addition to directing the transaction processing systems to perform requested data modifications, the global code system directs appropriate shadow code systems to perform the modifications. A shadow code system is a database management system which is similar to the global code system, except that its data can only be modified by the global code system. One shadow code system resides in each "geographic area" of the transaction processing environment. A geographic area is a locale served by one or more transaction processing systems. Each shadow code system receives all code maintenance operations distributed to any transaction processing system in its geographic area. Thus, each shadow code system provides a complete, local, current copy of all data used in its geographic area.

The purpose of the shadow code systems is to enable a remote application to easily access the codes. A remote application is a program which processes, but does not modify, the transaction processing data of a particular geographic area. An example would be a software program to generate area-wide reports from such data.

The remote applications could conceivably retrieve data directly from the global code system. But the global code system and the remote applications would generally be implemented on distinct computer systems in distinct geographic areas. Accordingly, direct communications would be slow and expensive. Furthermore, doing so would require the global code system to distribute data to each remote application and would therefore increase the average response time of the global code system. Because the global code system and the transaction processing systems communicate in real time, minimal response time is critical.

Users and application programs communicate with the global code system through a front end having a limited number of standard, high-level commands. Because it insulates the users and application programs from the physical details of the database, the front end reduces the effort of users in learning the system and reduces the effort of integrating transaction processing systems into the transaction processing environment. Furthermore, the global code system can be maintained (i.e., the low level structure of its database can be modified) without necessitating users to be re-trained or application programs to be re-written.

Access to the global code system by the users and application programs is controlled at the machine level, the file level and the application level. At the application level, access to specified data maintenance operations can be restricted, access to specified fields or records can be restricted, or access can be limited based on specified ranges of field values. The multitude of levels of restrictions facilitates providing users with adequate power to operate the global code system effectively without compromising system security.

The global code system supports the standard data maintenance operations, i.e., creating, reading, updating and deleting records. These operations are similar to the data maintenance operations of the conventional transaction processing environment. However, because the global code database stores a current copy of all reference data, the read operation of the present invention can easily present views of multiple fields from multiple records, regardless of whether the records are storm in a single transaction processing system. The global code system additionally supports several code-specific code maintenance operations. One, called "discontinue", freezes the data stored in a record. A second, called "outsee", enables historic chaining of a discontinued record by providing a cross-reference from it to a record which supersedes it.

All data operations performed on the global code system are recorded in an audit trail. Because it enables any malicious or erroneous operations to be traced, the audit trail module encourages users to exercise caution and to comply with company policies. Additionally, it facilitates undoing malicious or erroneous operations and recovering from system crashes. Furthermore, the audit trail can be used to generate system usage statistics that can be used to fine-tune the system and thereby increase performance.

Some data operations are "exceptional" in that they need to be performed periodically and they require a substantial amount of time to complete. These operations can be performed in a background mode, and thus can be invoked without sacrificing on-line serviceability. For example, an "autogen" operation automatically propagates a specified update to each occurrence of a specified field. As a second example, an "annual purge" operation deletes records which have been inactive for a specified amount of time.

The global code system uses a large amount of configuration data which specifies, for example, the security profiles of authorized users, the physical layout of the transaction processing environment, and details about the transaction processing systems. These values would be difficult to change if hard coded, as any change would necessitate modifying the source code of the global code system. Accordingly, in the present invention such data are stored in configuration tables. The values in the tables can be changed without modifying or re-compiling the source code.

BRIEF DESCRIPTION OF THE DRAWINGS

FIG. 3A shows a customer record on an order processing system of the transaction processing system of FIG. 1.

FIG. 3B shows a customer record on an accounting system of the transaction processing system of FIG. 1.

FIG. 3C shows a customer record on an inventory system of the transaction processing system of FIG. 1.

FIG. 6 shows a high-level flowchart of the sample transaction of FIG. 2 carried out on the global code system of FIG. 5.

FIG. 7 shows a customer record of the global code system of FIG. 5.

DETAILED DESCRIPTION OF THE PREFERRED EMBODIMENTS

Figure 1:
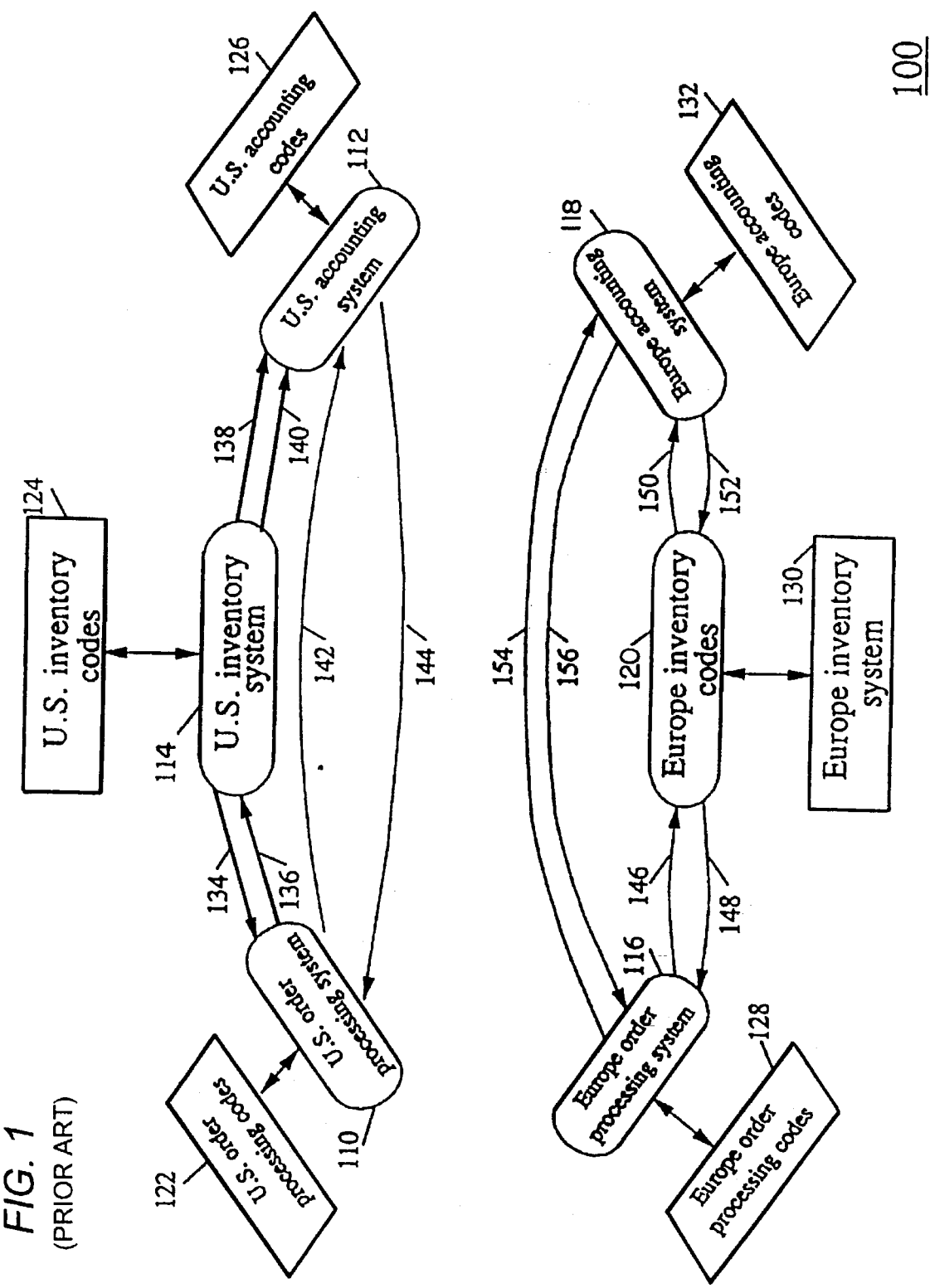
FIG. 1 shows a block diagram of a conventional transaction processing environment.

Illustration of the Deficiencies of Conventional Automated Transaction Processing Environment FIG. 1 shows a block diagram of the conventional transaction processing environment, as discussed in the background section of this document. In FIG. 1, the conventional transaction processing environment 100 includes a U.S. order processing system 110, a U.S. accounting system 112, a U.S. inventory system 114, a European order processing system 116, a European accounting system 118 and a European inventory system 120. Each of the transaction processing systems maintains a database, depicted as databases 122, 124, 126, 128, 130 and 132. The U.S. transaction processing systems communicate with one another in a batch mode over data paths 134–144, while the European transaction processing systems communicate with one another over data paths 146–156. The European and U.S. systems may also communicate with one another in a batch mode over data paths.

Figure 2:
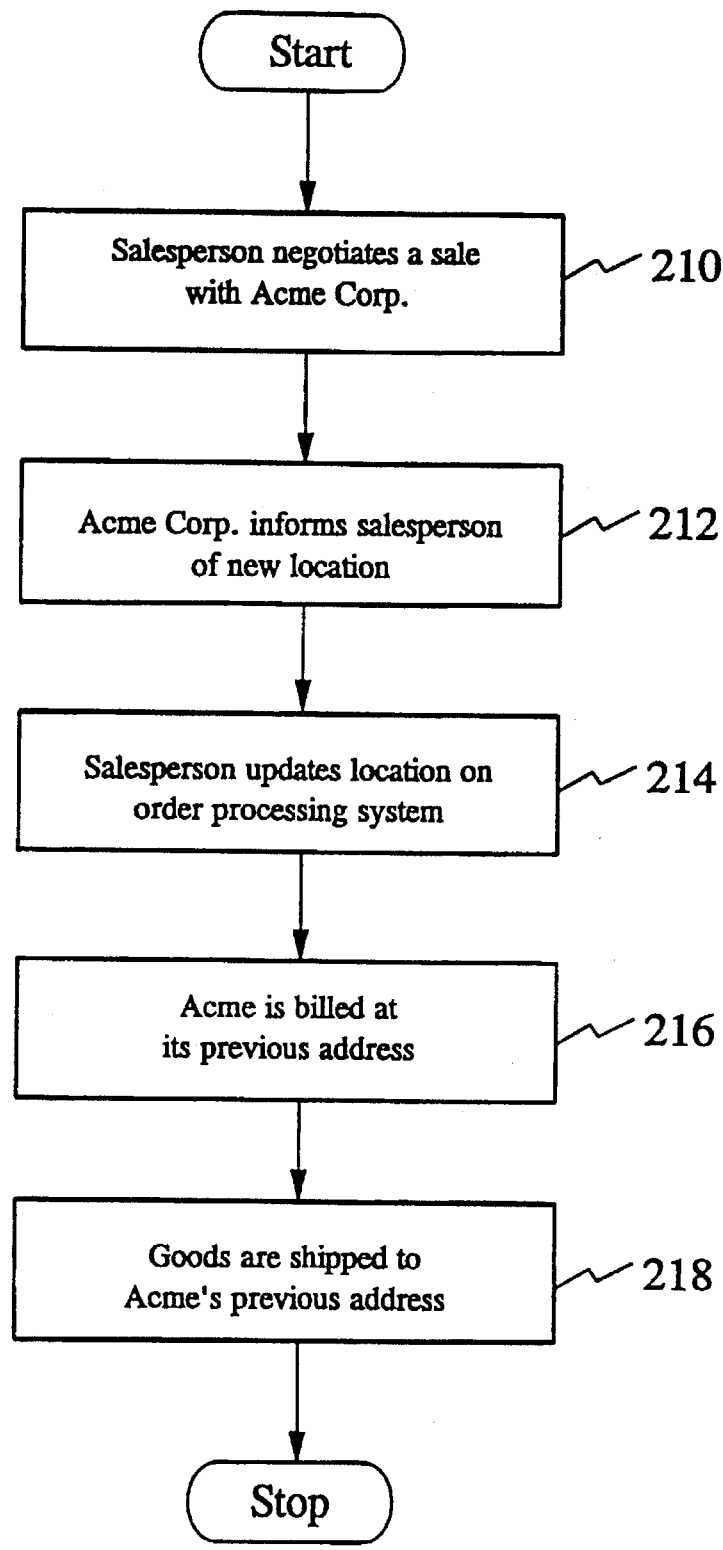
FIG. 2 shows a high-level flowchart of a sample transaction carried out on the conventional transaction processing environment of FIG. 1.

FIG. 2 shows a flowchart of a sample transaction as carried out in the conventional transaction processing environment 100. FIGS. 3A, 3B and 3C show client records used in the sample transaction. Specifically, FIG. 3A shows an order processing client record 310 in the U.S. order processing system 110; FIG. 3B shows an accounting client record 312 in the U.S. accounting system 112; and FIG. 3C shows an inventory client record 314 in the U.S. inventory system 114.

In the sample transaction, a salesperson negotiates a sale of goods with a company called Acme Corp. (see step 210). During the discussions, the salesperson is informed that Acme has moved (see step 212). Accordingly, the salesperson updates a purchasing address field 316 of the order processing client record 310 (see step 214).

Ideally, the accounting client record 3 12 and the inventory client record 314 would then be immediately updated to reflect the change in address. Reconciling the records may require substantial effort if, for example, the salesperson cannot directly access the U.S. accounting system 112 and the U.S. inventory system 114. Furthermore, customer code fields 302, 304, and 306 of the client records 310, 312 and 314, respectively, are different, and customer name fields 324, 326 and 328 are (erroneously) slightly different. These differences may make it difficult to unambiguously identify the appropriate accounting client record 312 and the appropriate inventory client record 314.

In part because of these difficulties in reconciling the records, the customer is billed and the goods are shipped before the addresses are updated in the U.S. accounting system 112 and the U.S. inventory system 114. Thus, in step 216, the salesperson's company sends a bill to the former address of Acme's accounting department (as indicated by an accounting address field 318). Finally, in step 218, the salesperson's company ships the goods to the former address of Acme's receiving department (as indicated by a receiving address field 320).

Overview of Transaction Processing Environment of the Present Invention

Figure 4:
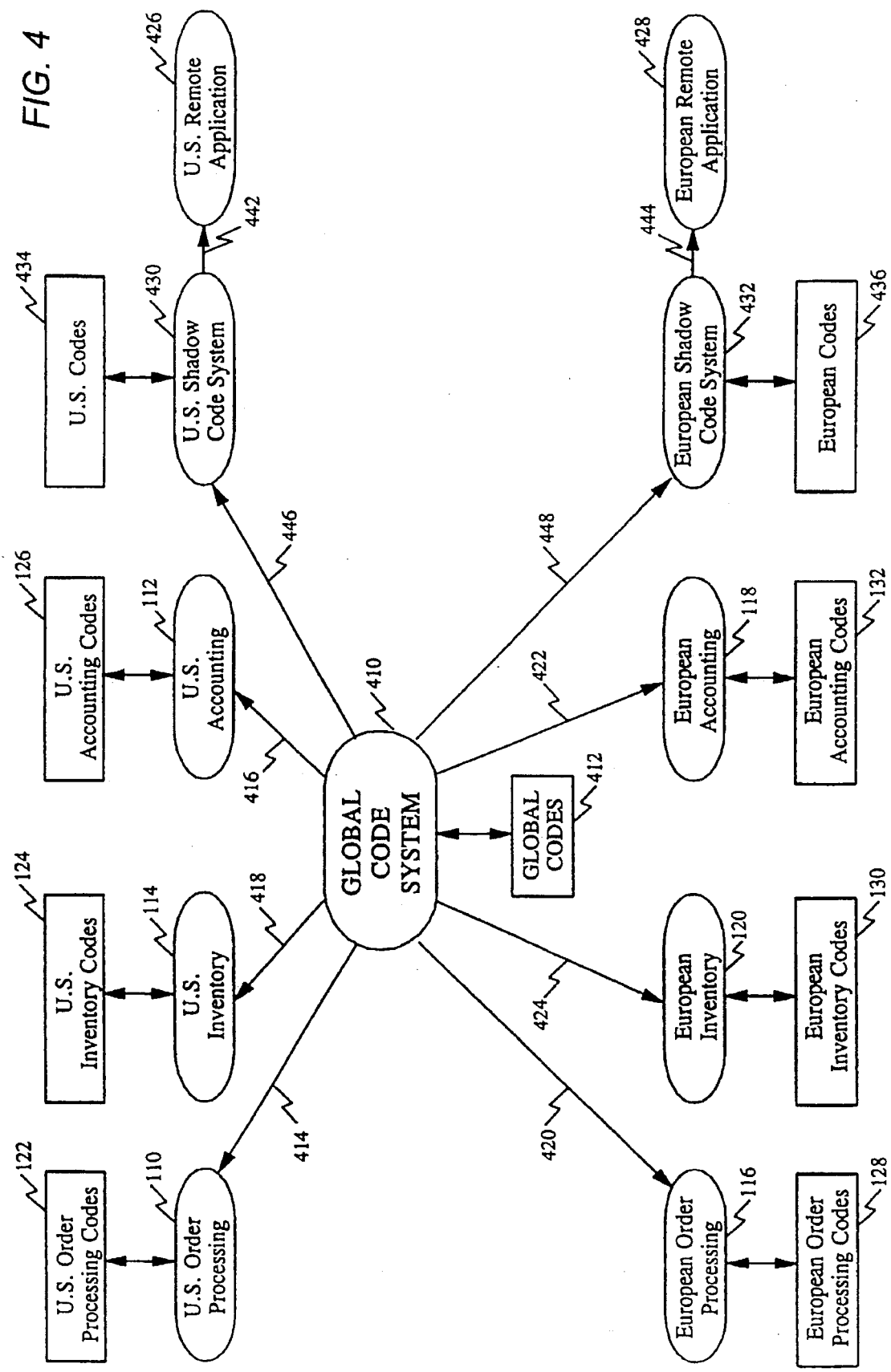
FIG. 4 shows a block diagram of the structure of a representative environment in which the present invention could operate.

FIG. 4 is a high level block diagram illustrating an integrated transaction processing environment 400 constructed according to the present invention. A global code system 410 coordinates code maintenance of the transaction processing systems. The global code system 410 has a global code database 412 and communicates with the U.S. order processing system 110, the U.S. accounting system 112, the U.S. inventory system 114, the European order processing system 116, the European accounting system 118 and the European inventory system 120 in an on-line manner through data paths 414–424, respectively. As in FIG. 1, the automated transaction processing systems have databases 122, 124, 126, 128, 130 and 132.

In the transaction processing environment 400, all "referential code maintenance operations" are requested through the global code system 410. A referential code maintenance operation is an operation that creates, reads, updates or deletes a "reference" record. A reference record stores data about entities involved in a transaction. In contrast, a transactional record stores data about a specific transaction. Examples of reference records include a product record, a customer record and an address record. An example of a transaction record is an order record which indicates that 25 widgets were sold to Mr. Jones and are to be shipped to his warehouse at 1234 Maple Street.

Upon receiving a request to create, update or delete a reference record, the global code system 410 creates, updates or deletes the record on its database 412. Then, in real time, the global code system 410 sends messages directing any transaction processing system which has accessed the record to create, update or delete the record on its database.

In addition to directing the transaction processing systems to perform requested data modification operations, the global code system 410 directs a U.S. shadow code system 430, a European shadow code system 432, or both, via on-line data paths 446 and 448, to create, update or delete the record on its database. The U.S. shadow code system 430 receives any code maintenance operations distributed to any of the U.S. transaction processing systems, while the European shadow code system 432 receives any code maintenance operation distributed to any of the European transaction processing systems. Each shadow code system thus provides a complete, current copy of all locally-accessed data. The U.S. shadow system 430 stores the U.S. codes in a U.S. codes database 434, and the European shadow system 432 stores the European codes in a European codes database 436.

The U.S. shadow code system 430 and the European shadow code system 432 are used by a U.S. remote application 426 and a European remote application 428, respectively. The remote applications process (but do not modify) the data used in their geographic area. An example of a remote application is a report generating program which compiles and analyzes such data. The U.S. remote application 426 program communicates with the U.S. shadow code system 430 via an on-line, read-only data path 442, while the European remote application 428 communicates with the European shadow code system 432 via an on-line, read-only data path 444.

Global Code System—High Level Structure

Figure 5:
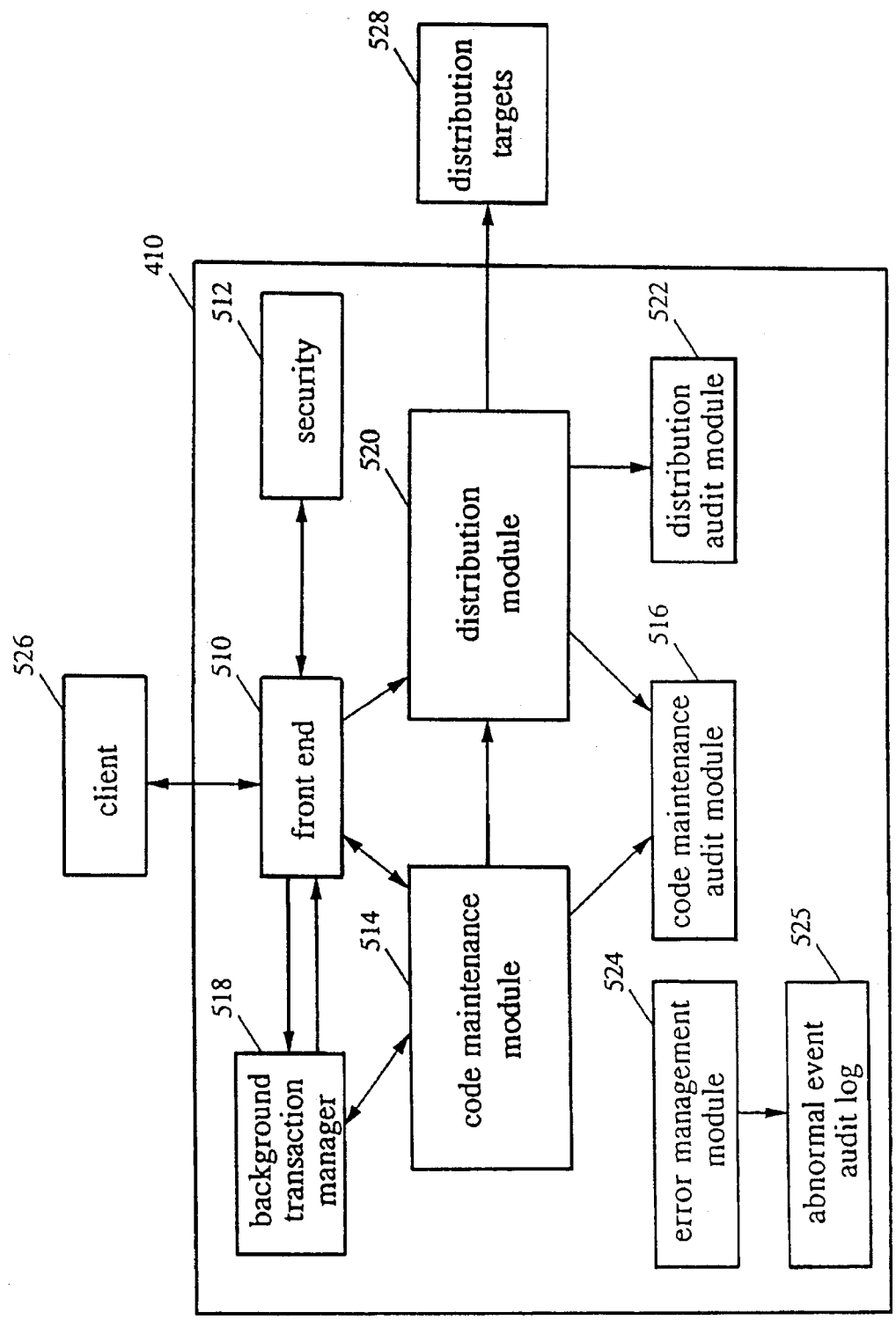
FIG. 5 shows a block diagram of the structure of a global code system of the present invention.

FIG. 5 shows a block diagram which depicts the structure of the global code system 410. The global code system 410 includes a front end 510, a security module 512, a code maintenance module 514, a code maintenance audit module 516, a background transaction manager 518, a distribution module 520, a distribution audit log 522, an error management module 524 and an abnormal events log 525.

A "client" 526 accesses the global code system 410 through the front end 510. The client 526 could either be a user or an external application program. The front end 510 receives high-level, standardized requests and presents data in a standardized format. It thus enables the client 526 to issue requests and receive data without regard to the physical details of the global code database 412.

The front end 510 invokes the security module 512 to determine security restrictions on the client's access to the global code system 410. The security module 512 enforces the access restrictions at three levels. First, at the machine level, it determines whether the client 526 is authorized to log in to the machine on which the global code system 410 is implemented. Second, at the file level, it determines whether the user is authorized to read from or write to a specified file. Third, at the application level, it determines whether the client 526 is authorized to request specified operation on a specified record.

Once the security module 512 has found the client 526 to be authorized, the front end 510 invokes the code maintenance module 514 with the request. The code maintenance rood tie 514, in turn, invokes the security module 512 to determine whether the client 526 is authorized to issue the request. If the client 526 is authorized, the code maintenance module 514 carries out a global code maintenance operation specified by the request. The global code maintenance operation involves creating, reading, updating or deleting a record on the global code database 412.

The code maintenance module 514 next invokes the code maintenance audit module 516 to log derailed information about the global code maintenance operation in the code maintenance audit log 516. The code maintenance audit log 516 enables after-the-fact tracing of the clients and operations which caused any modifications to the global code database 412. The traceability encourages adherence to system usage policies, and it facilitates undoing malicious or erroneous operations and recovering from system crashes. The code maintenance audit log 516 can also be used to generate system usage statistics which can be used to fine-tune the system and thereby increase performance.

After logging the global code maintenance operation, the code maintenance module 514 may invoke the distribution module 520 to instruct "distribution targets" 528 in one or more "distribution areas" to perform "distribution operations". The distribution areas may be the geographic areas from which the operation was requested, as well as any additional areas specified by the client 526. The distribution targets 528 in each distribution area are the shadow code system in that area as well as each transaction processing system in the area which stores records of the type operated upon. The distribution operations involve creating, updating or deleting records on the databases associated with the distribution targets 528 so as to maintain data integrity and data currency between the global code system and the shadow and transaction processing systems.

The distribution module 520, in turn, invokes the distribution audit module 522 to log derailed information about each distribution operation in a distribution audit trail. The purposes of the distribution audit module are similar to those of the code maintenance audit module.

The background processing module 518 is invoked by the front end 510 to carry out code maintenance operations in a background mode. The client 526 requests the operation with all input values necessary to carry it out. The background transaction manager 518 invokes the code maintenance module 514, requests the desired operation, and provides the code maintenance module 514 with the input values when prompted for them.

The error management module 524 is invoked by any other module upon the occurrence of an exceptional error such as one caused by a communication malfunction, a database error or a program logic error. The invoking module sends the error management module 524 a code which identifies the error. The error management module then takes a snapshot of the system-specific information that would help isolate the cause of the error, and then logs the error and the snapshot data to the abnormal events audit log. Depending on the nature of the error, the error management module 524 may then attempt to recover from the error without human intervention. Such an attempt, as well as its results, are logged to the abnormal events audit log 525. An administrative user periodically examines the abnormal events audit log 525 and may attempt to recover from any errors not already automatically corrected by the error management module 524. In addition to facilitating the recovery of exceptional errors, the abnormal events audit log 525 indicates any recurring patterns of exceptional errors. Such information can be used to identify bugs in the global code system 410, malfunctions in the transaction processing environment, and ways to improve robustness.

The global code system 410 requires a substantial amount of configuration data. For example, the security module 512 needs to know the privileges of each client 526, and the distribution module 520 needs to know language preferences, system release versions and configuration data for the distribution targets 528. The configuration data could be specified in the source code of the global code system 410. In a preferred implementation, however, the configuration data are stored in configuration tables. The tables are not explicitly shown in FIG. 5 but are instead shown as part of the structure of the modules of the global code system 410. The tables specify which clients can perform which operations on which records, the physical layout of the transaction processing environment 400, appropriate formats for messages sent to the shadow code systems and transaction management systems, and the interdependencies between the records.

The values in the tables can be changed without modifying or recompiling the source code. Such changes can thus be made without necessitating any system down time. Furthermore, the tables are accessed in real time, immediately before the use of the configuration data retrieved. Consequently, any table updates take effect immediately.

Global Code System—High Level Operation

FIG. 6 shows a flowchart of the sample transaction discussed above as carried out on the transaction processing environment 400 of the present invention. FIG. 7 shows a customer record 710 used in the sample transaction. In the sample transaction, a salesperson negotiates a sale of goods with a company called Acme Corp. (see step 210). During the negotiations, the salesperson is informed that Acme has moved (see step 212). In response, the salesperson updates the addresses in a headquarters address field 714, a purchasing address field 716, an accounting address field 718, a receiving address field 720, and the salesperson updates the phone number in a headquarters contact field 722, a purchasing contact field 724, an accounting contact field 726 and a receiving contact field 728 (see step 614). The salesperson then requests the global code system 410 to distribute the update to the geographic area in which the transaction takes place (i.e., the U.S.) (see step 616). The global code system 410 immediately carries out the distribution by sending messages to the U.S. order processing system 110, the U.S. accounting system 112, the U.S. inventory system 114 and the U.S. shadow code system 430 which instruct those systems to perform the update on the copy of the order processing customer record 712 in the respective databases of those systems.

Next, the salesperson records the sale on the U.S. order processing system (see step 618). The bill is then sent to the billing address currently reflected on the customer record 710, i.e., the updated billing address (see step 620). Finally, the goods are sent to the receiving address currently reflected on the customer record 710, i.e., the updated receiving address (see step 622).

The elements of the global code system 410 will now be described in detail.

Front End

The front end 510 provides a consistent, high-level interface to the global code system 410. Specifically, the interface receives requests and sends presentations in a manner which is independent of the type of data involved and independent of the physical structure of the global code database 412. As a result, a data structure in a system accessed with the front end 510 can be modified without affecting how a user or another system access the modified system. Such a modification necessitates only appropriate revisions to the front end 510.

Figure 8:
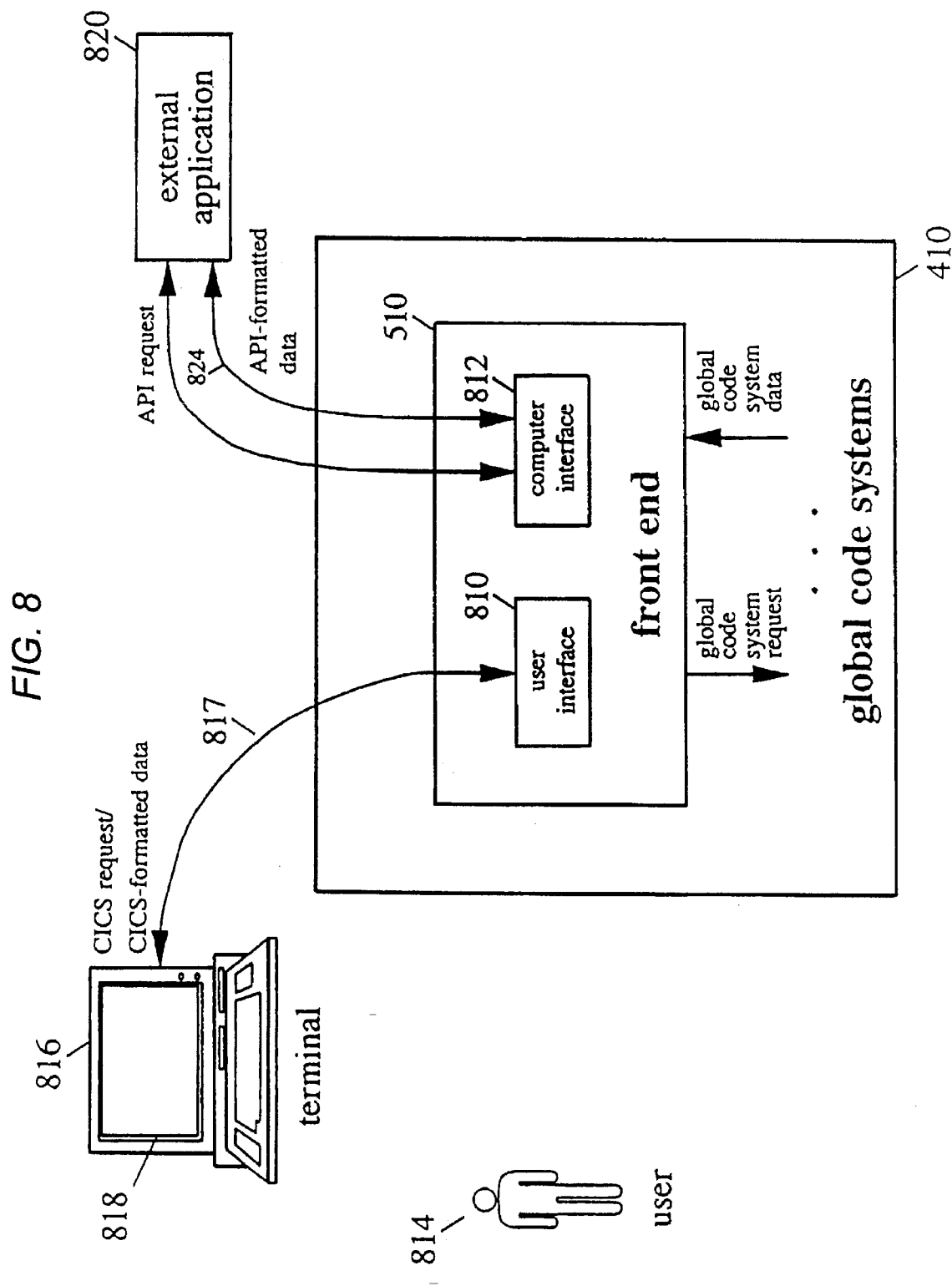
FIG. 8 shows a data flow representation which illustrates the operation of a front end of the global code system of FIG. 5.

FIG. 8 shows a data flow representation which illustrates the operation of the front end 510. Referring to FIG. 8, the front end 510 has a user interface 810 and a computer interface 812. A user 814 operates a terminal 816 which communicates with the user interface 819 via an on-line data path 817. The user interface 810 presents a CICS (customer information control system) screen 818 of options and output from other modules of the global code system 410 on the terminal 816. The user 814 selects options and inputs data through the CICS screen 818. The user interface 810 interprets the options and data received from the user 814 and instructs the other modules accordingly.

The computer interface 812 generates messages in the API (application program interface) language containing output from other modules of the global code system 410 and sends the messages to an external application 820 via a data path 822. The computer interface 812 receives API messages from the external application 820 via a data path 824. It interprets these messages and instructs the other modules accordingly. The external application 820 is a remote application, such as a report generating program, that required global data. (As stated, a remote application that required data associated with a particular geographic area would access a shadow code system rather than the global code system.)

Figure 9A:
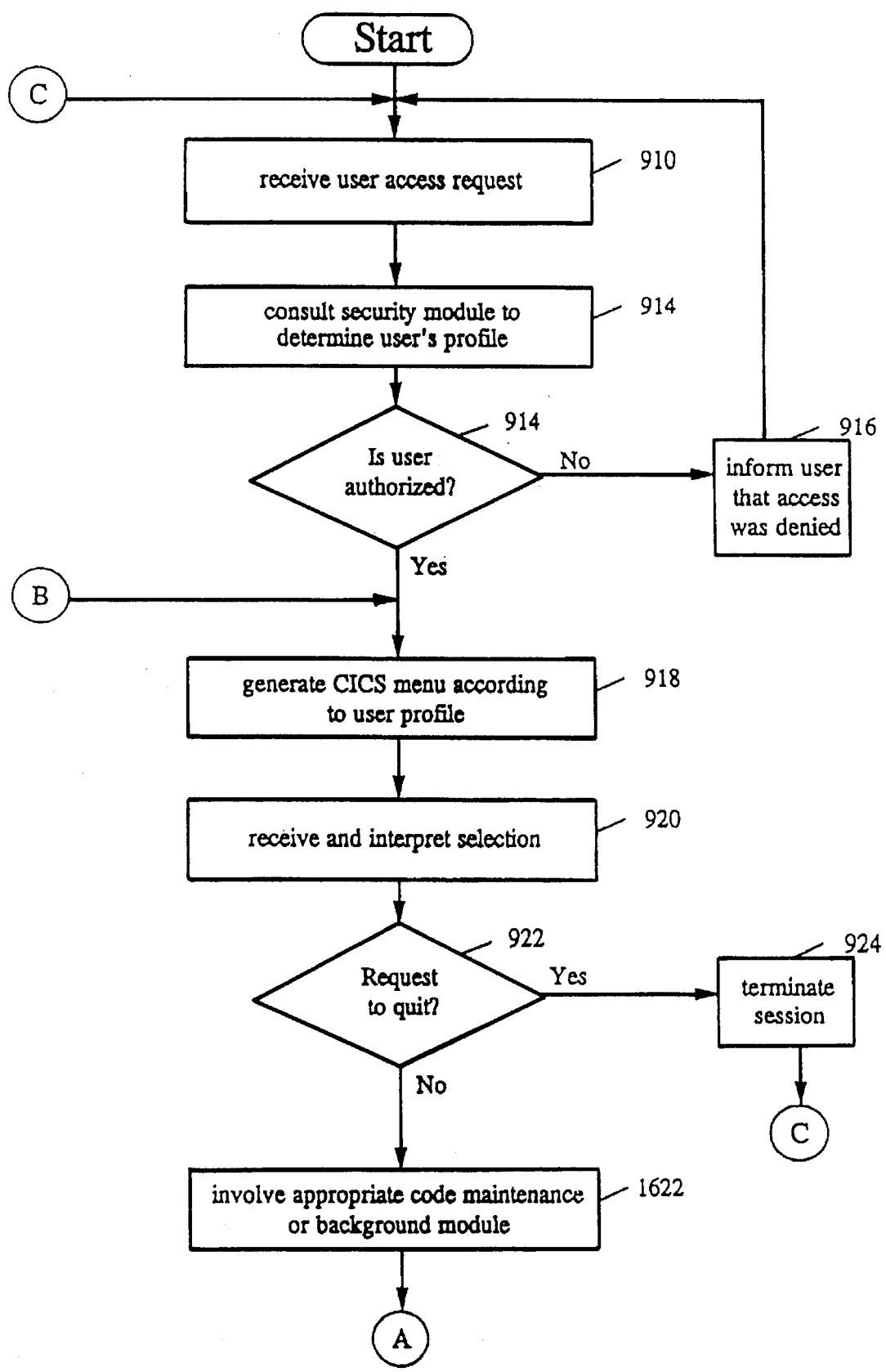
FIGS. 9A and 9B show a flowchart which illustrates the operation of a user interface of the front end of FIG. 8.
Figure 9B:
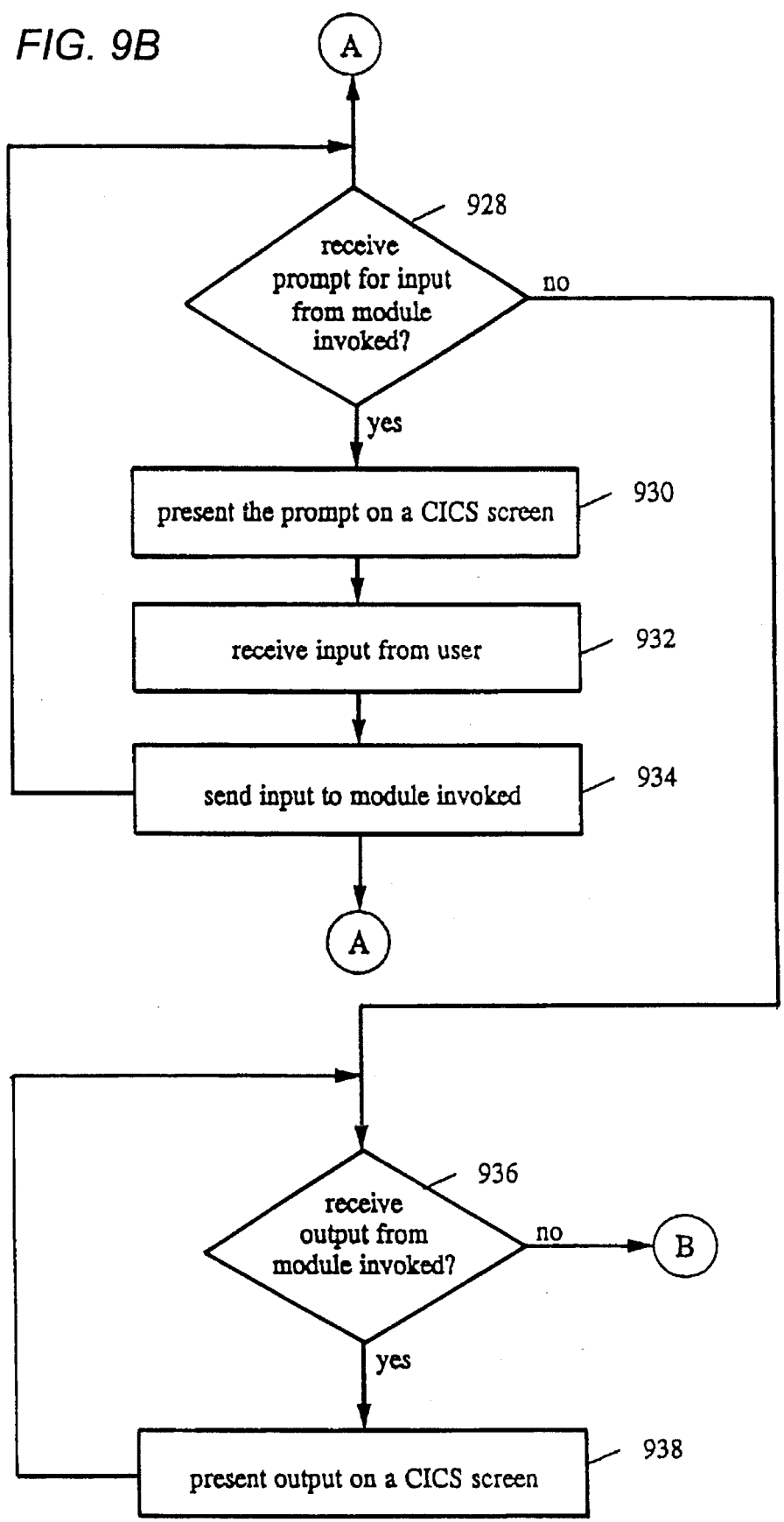

FIGS. 9A and 9B illustrate the method of the user interface 810. Referring to FIG. 9A, the user interface 810 first receives a request from the user 814 to access the global code system 410 (see step 910). The user interface 810 invokes the security module 512 to determine whether the user 814 is authorized and, if so, to also determine privilege and configuration data for the user (see step 912). The privilege and configuration data is called a user profile. If the security module 512 returns an indication that the user 814 is not authorized (see step 914), then the user interface 810 informs the user 814 that access has been denied (see step 916) and returns to step 910 to process the next access request.

Otherwise, the user interface 810 next uses the user profile to generate a menu (see step 918). Options on the menu are limited to those that the user profile indicates the user 814 is authorized to select. As with all data sent to the user 814, the menu is presented as a CICS screen 818 on the terminal 816.

The user interface 810 receives and interprets the user's selection (see step 920). If the selection is a "quit" option, the session is terminated, and the user interface 810 returns to step 910 to process the next access request (see steps 922 and 924). Otherwise, the user interface 810 invokes the appropriate module to perform the option selected (see step 926). The appropriate module could be the code maintenance module 514 or the background transaction manager 518. The user interface 810 may then receive a prompt for input from the module invoked (see step 928). If so, it presents the prompt as a CICS screen 818 on the terminal 816 (see step 930). The user interface 810 then receives data entered on the terminal 816 (see step 932) and forwards the data to the module invoked (see step 934). Steps 928–934 are repeated for any additional prompts for input.

After processing all input, the user interface 810 may receive output from the module invoked (see step 936). If so, it presents the output as a CICS screen 818 on the terminal 816 (see step 938). Steps 936 and 938 are repeated until all output has been processed. The user interface 810 then returns to step 910 to process additional requests.

Figure 10:
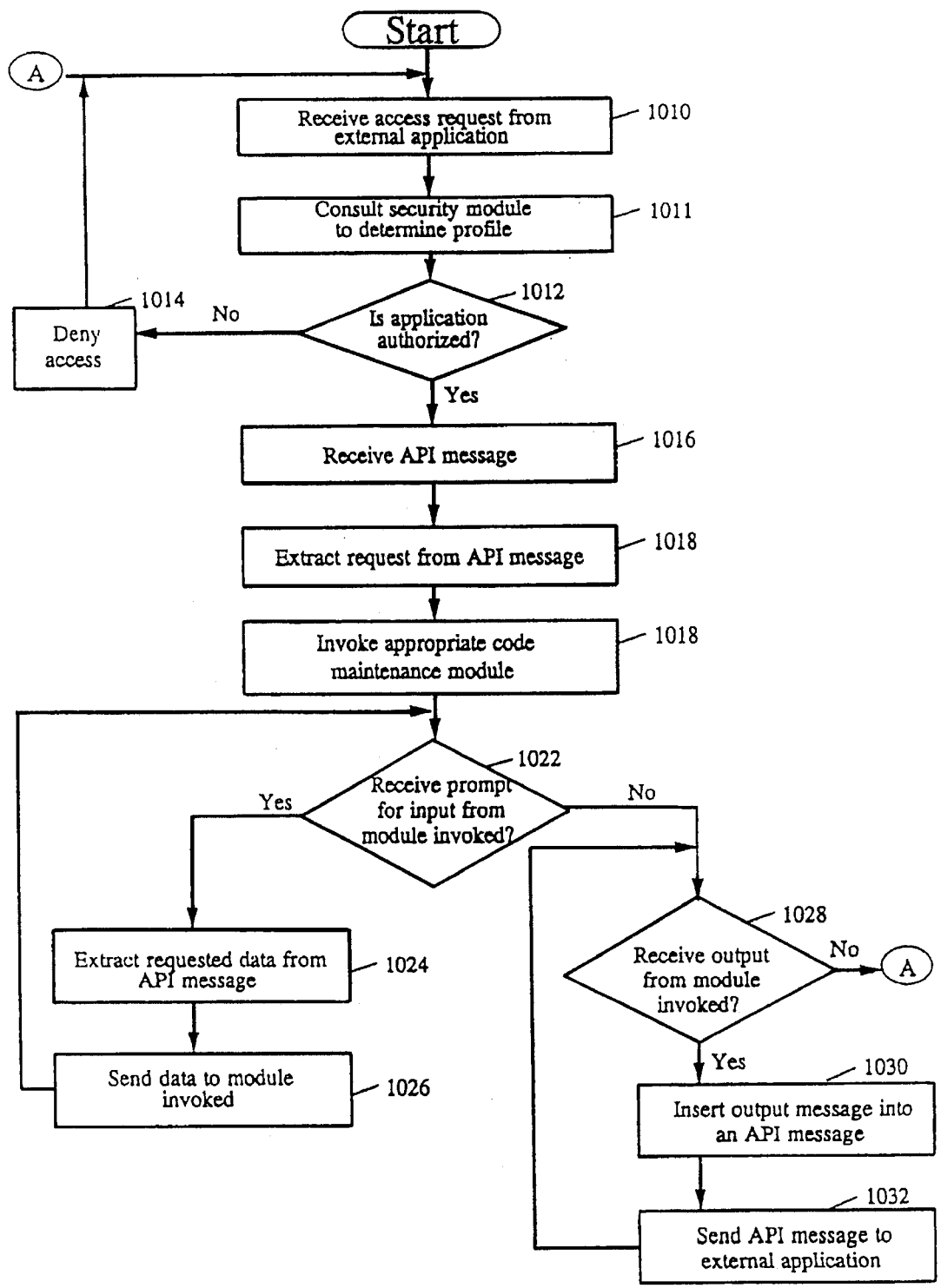
FIG. 10 shows a flowchart which illustrates the operation of a computer interface of the front end of FIG. 8.

FIG. 10 illustrates the operation of the computer interface 812. Referring to FIG. 10, the computer interface 812 first receives a request from the external application 820 to access the global code system 410. The computer interface 812 invokes the security module 512 to determine whether the external application 820 is authorized and, if so, to also determine privilege and configuration data for the external application 820 (see step 1011). The privilege and configuration data is called the external application profile. If the security module 512 returns an indication that the external application 820 is not authorized (see step 1012), then the computer interface 812 denies access (see step 1014) and returns to step 1010 to process additional access requests.

Otherwise, the computer interface 812 next receives a message in the API protocol from the external application 820 (see step 1016). It extracts a request for a code maintenance operation from the message (see step 1018) and invokes the code maintenance module 514 to perform the operation (see step 1020).

The code maintenance module 514 may then prompt the computer interface 812 for input (see step 1022). If so, the computer interface 812 extracts the requested data from the API message (see step 1024) and forwards it to the code maintenance module 514 (see step 1026). Steps 1022–1026 are repeated if there are additional prompts for input.

After processing all input, the computer interface 812 may receive output from the code maintenance module 514 (see step 1028). If so, it inserts the output into a standard API message for the external application 820 (see step 1030). It then sends the message to the external application 820. Steps 1028–1030 are repeated if there is additional output. Finally, after processing all output, the computer interface 812 returns to step 1010 to process additional requests from external applications 820.

Security Module

The global code database 412 controls access to much of a company's reference data and thus to a large extent controls what can be determined about the company and what can be done on behalf of the company. A high level of control over who can perform what operations on the data thus to a large extent results in a high level of control over the company's business policies. Accordingly, the security module 512 provides sophisticated protection mechanisms at three levels to control data operations of the global code system 410.

Figure 11:
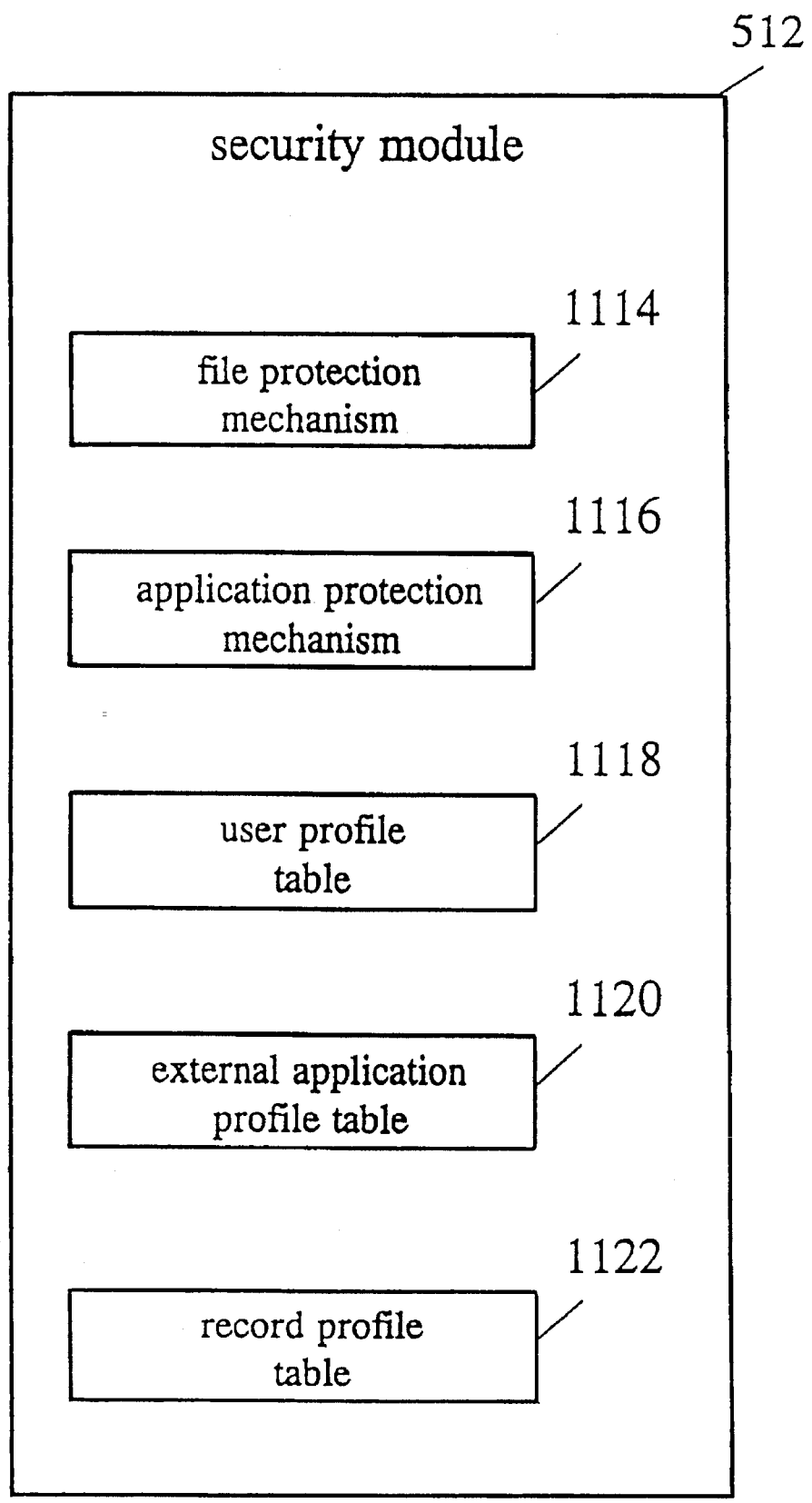
FIG. 11 shows a block diagram of the structure of a security module of the global code system of FIG. 5.

FIG. 11 shows the structure of the security module 512, which comprises a file protection mechanism 1112, an application protection mechanism 1114, a user profile table 1118, an application profile table 1120, and a record profile table 1122.

The user profile table 1118 specifies configuration and security data for each authorized user. Such data include the files the user is permitted to read, the files the user is permitted to write, the user's login id, real name, preferred language and default printer. Note that various aspects of the user's security profile could be inherited from any groups to which the user belongs. For example, the groups could correspond to the department and/or position of the user.

The external application profile data 1120 specifies configuration and security data for each authorized external application 820. Such data include the files the external application 820 is permitted to read and the preferred language of the external application 820.

The record profile table 1122 specifies restrictions on the access of each record type. For example, an entry for a particular record type could specify, for each group, whether the group is permitted to create records of that type, whether the group is permitted to view or modify the such records or particular fields of such records, the fields which cannot be blank, the range of permissible values for each field and the permissible combinations of field values.

Several layers of security protect the global code database 412. A machine security mechanism (not shown) provides the first layer by restricting access to the machine on which the global codes database 412 is implemented. This mechanism is external to the global code database 412.

It could identify the entry, for example, by a user id and password entered by the user 814. It returns either user profile data or an indication that the user 814 is not authorized. The machine security protection mechanism is invoked by the front end 510 with a login request, which could be a user id and a password.

The second layer of protection is provided by the file protection mechanism 1112, which determines the access rights of a specified user 814 to a specified file. The mechanism operates by consulting an entry for the user 814 in the user profile table 1118, determining whether the entry specifies read, write or no access rights for the file and returning an indication of the type of access specified. The front end 510 invokes the file protection mechanism 1112 to determine which code maintenance operations a particular user 814 is permitted to execute on a particular file. The front end 510 then restricts the code maintenance operations available to the user 814 accordingly.

The third layer of protection is provided by the application protection mechanism 1114, which determines restrictions of a specified user 814 in modifying a specified record. (As used in this document, "modifying" includes inserting, updating and deleting.) The mechanism consults the user profile table 1118 to determine the group to which the user 814 belongs. It then consults the record profile data to determine any application restrictions that apply to users in that group when modifying the record. It returns any such restrictions to the module which invoked it. The application protection mechanism 1116 is invoked by the code maintenance module 514 to determine which values to prompt the user 814 for, as well as to verify proposed modifications.

Code Maintenance

The code maintenance module 514 supports standard maintenance operations (i.e., creating, reading, updating and deleting records) as well as code-specific maintenance operations. The code maintenance module 514 is invoked either by the front end 510 or by the background transaction manager 518.

Figure 12:
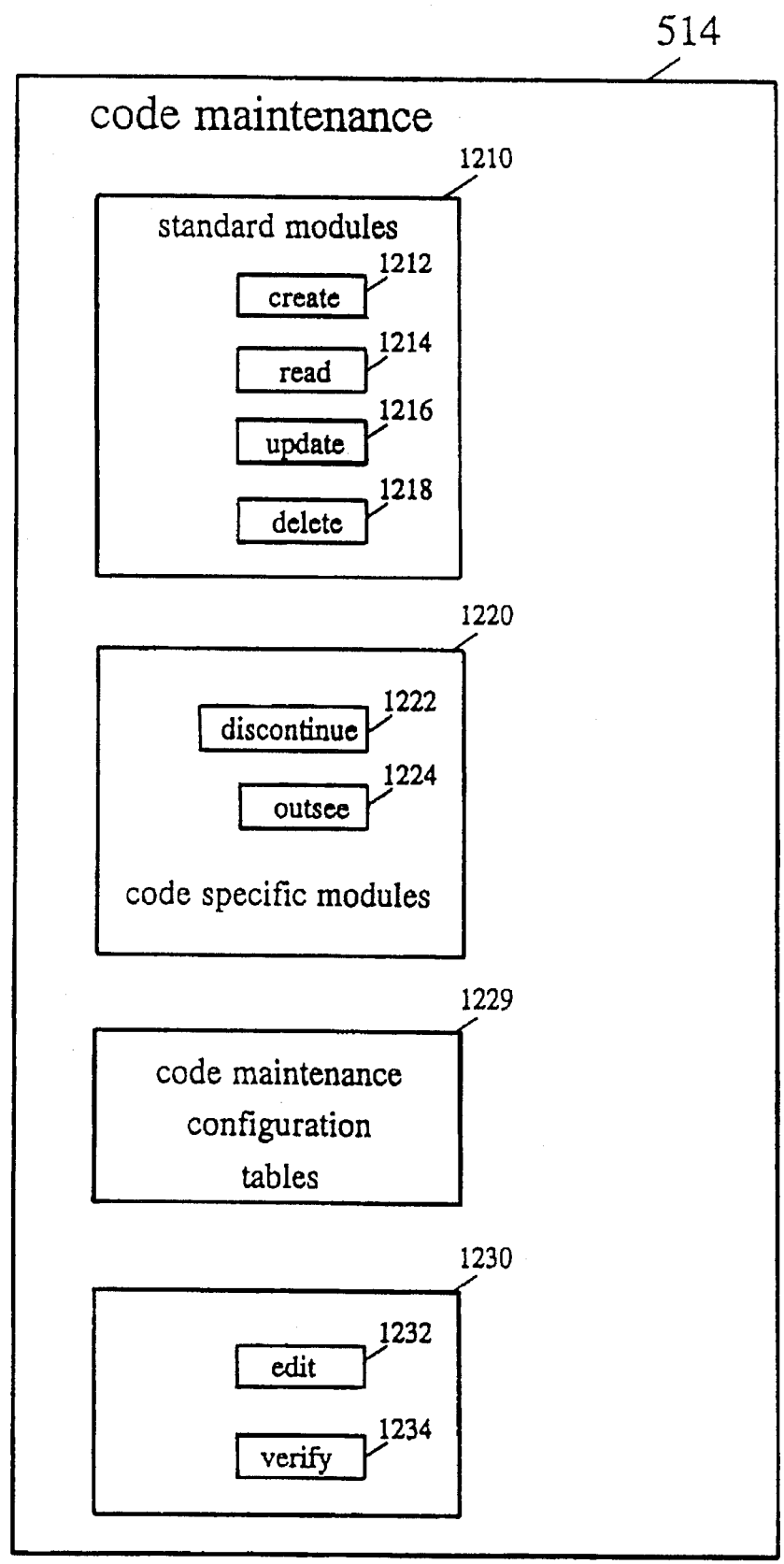
FIG. 12 shows a block diagram of a code maintenance module of the global code system of FIG. 5.

FIG. 12 shows the structure of the code maintenance module 514. In FIG. 12, the standard data operations are represented by standard modules 1210, namely, a create module 1212, a read module 1214, an update module 1216 and a delete module 1218. The operation of the standard modules 1210 is described below and illustrated by FIGS. 14–17. The code specific data operations are implemented with code specific modules 1220, namely, a discontinue module 1222, an outsee module 1224 and an autogen module 1226. Operation of the code specific modules 1220 is described below and illustrated by FIGS. 18–20.

The standard modules 1210 and code specific modules 1220 use utilities 1230 which include an edit utility 1232 and a verify utility 1234. The edit utility 1230 handles text entry and revision. The verify utility 1234 determines whether requested modifications to a record comply with any modification restrictions imposed on the requester for the record. The verify utility 1234 determines such restrictions by invoking the application protection mechanism 1114. The verify utility 1234 returns an indication that the values are permissible or an indication of why they are not permissible.

Figure 13:
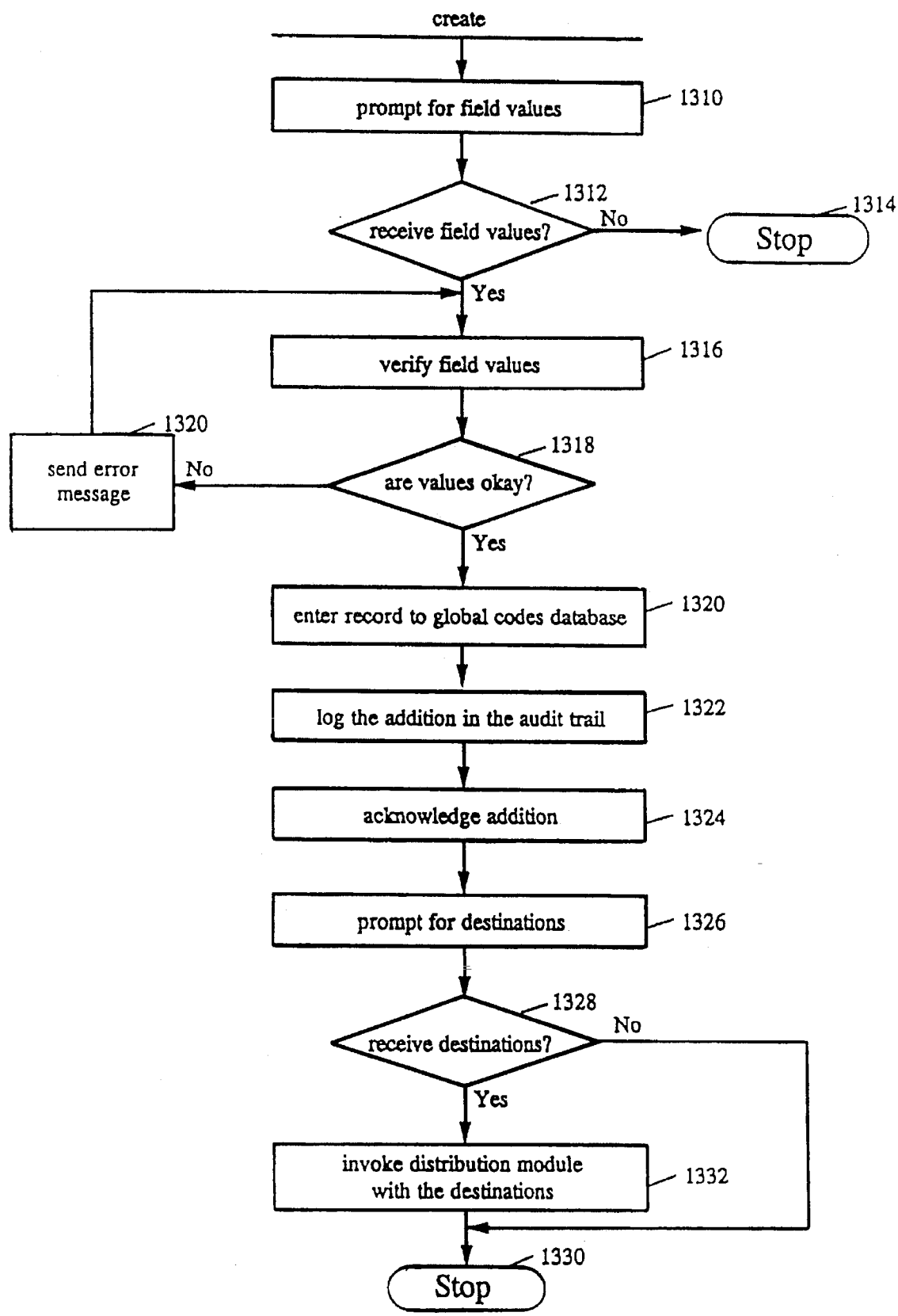
FIG. 13 shows a flowchart which illustrates the operation of a create module of the code maintenance module of FIG. 12.

FIG. 13 illustrates the method of the create module 1212. The create module is invoked by the front end 510 upon a request by the user 810 to create a record. The create module 1212 begins by prompting the user 814 for the field values of the new record (see step 1310). The user 814 responds by entering field values or a request to terminate (see step 1312). If it receives a request to terminate, the create module 1212 stops (see step 1314). Otherwise, it has the verify utility 1234 check the field values (see step 1316). If the verify utility 1234 returns an error status, an appropriate error message is sent to the user 814 (see steps 1318 and 1320), and the create module 1212 returns to step 1312 to receive new field values or a request to terminate.

Once the field values have been verified, the create module 1212 adds the new record to the global code database 412 (see step 1320). It then has the code maintenance audit module 516 log the addition (see step 1322), and acknowledges the successful addition (see step 1324).

Next, the create module 1212 prompts the user 814 for geographic areas to which the new record should be sent (see step 1326). If the user 814 enters no areas, the create module stops (see steps 1328 and 1330). Otherwise, the create module 1212 receives the areas and invokes the distribute module 520 to distribute the new record to those areas (see step 1332) and then stops (see step 1330).

Figure 14:
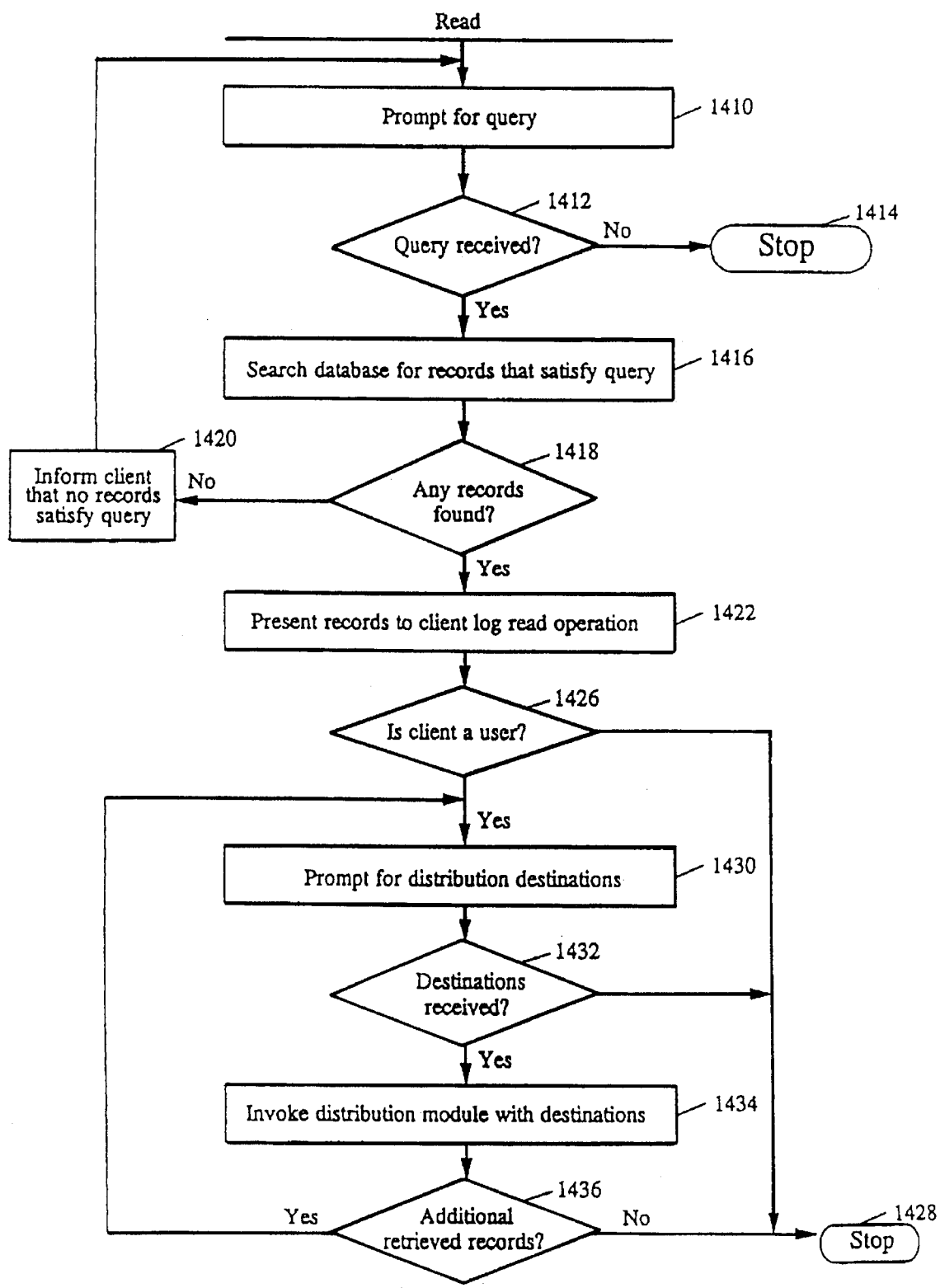
FIG. 14 shows a flowchart which illustrates the operation of a read module of the code maintenance module of FIG. 12.

FIG. 14 illustrates the operation of the read module 1214. The read module 1214 is invoked by the front end 510 upon a request by the client 526 (i.e., the user 814 or the external application 820) to view one or more records. If the client is the user 814, then the read module converses with the user 814 through the terminal 816. If, on the other hand, the client 526 is the external application 820, the read module converses with the external application 820.

The read module 1214 first prompts the client 526 for a database query (see step 14 10). It receives either the query or a request to terminate (see step 1412). If it receives a request to terminate, the read module 1214 stops (see step 1414). Otherwise, the read module 1214 searches the global code database 412 for the record or records that satisfy the query (see step 1416). If there are no such records, it presents the client 526 with a message to indicate this and enables the client 526 to enter another query (see step 1420). Otherwise, it presents the record or records to the client (see step 1422) and invokes the code maintenance audit log 516 to log the read operation (see step 1424).

If it is being controlled by the external application 820, the read module 1214 then terminates (see step 1426 and 1428). If, on the other hand, it is being controlled by the user 814, the read module 1214 next prompts the user 814 for any destination geographic areas to which a retrieved record is to be distributed (see step 1430). If the user 814 does not enter a destination area, the read module 1214 terminates (see steps 1428). Otherwise, the read module 1214 invokes the distribution module 580 to distribute the record to the specified destination areas (see step 1434). Steps 1430–1434 are repeated for any additional records retrieved (see step 1436).

Figure 15A:
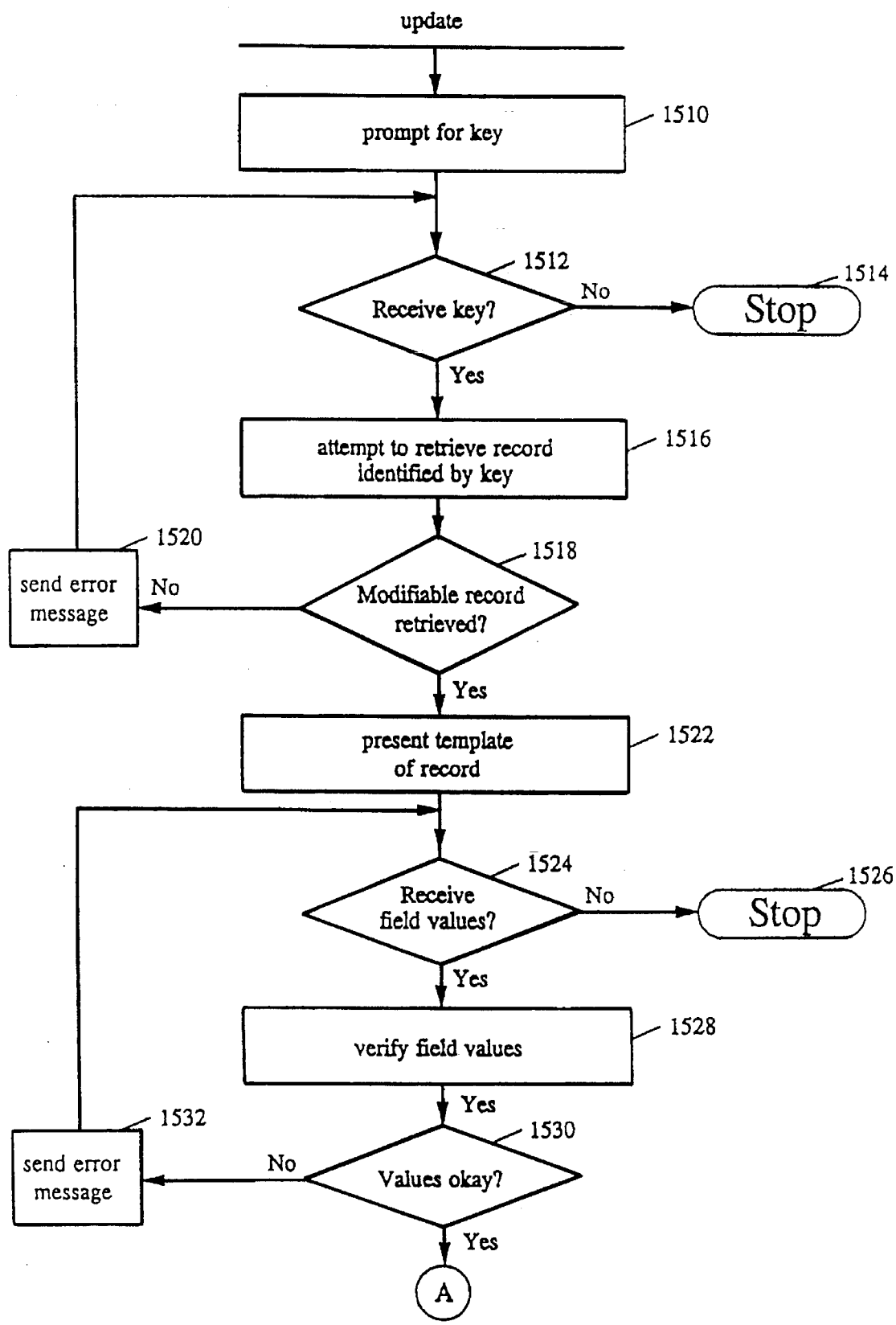
FIGS. 15A and 15B show a flowchart which illustrates the operation of an update module of the code maintenance module of FIG. 12.

FIG. 15 illustrates the operation of the update module 1216. The update module 1216 is invoked by the front end 510 upon a request by the user 810 to update a record. The update module 1216 begins by prompting the user 814 for a key value, i.e., a value of a field which unambiguously identifies a record (see step 1510). If the user 814 responds by sending a request to terminate, the update module 1216 stops (see steps 1512 and 1514).

If, on the other hand, the user 814 sends a key value, the update module 1216 attempts to retrieve the record identified by the key value from the global code database 412 (see step 1512 and 1516). If the key value identifies a record which does not exist or has been discontinued or outseed (see step 1518), the user 814 is informed via an appropriate error message (see step 1520) and is given the opportunity to send a new key value or a request to terminate.

If the key value identifies a record which can be modified, the update module 1216 next presents a template of the record which indicates the fields the user 814 can modify (see step 1522). The user 814 may send field values, or he may send a request to terminate (see step 1524). If the user 814 sends a request to terminate, the update module 1216 stops (see step 1526). Otherwise, the update module 1216 has the verify utility 1234 check the field values (see step 1528). If the verify utility 1234 returns an error status (see step 1530), the update module 1216 sends an error message to the user 814 (see step 1532), and then returns to step 1524 to process new field values or a request to terminate.

Figure 15B:
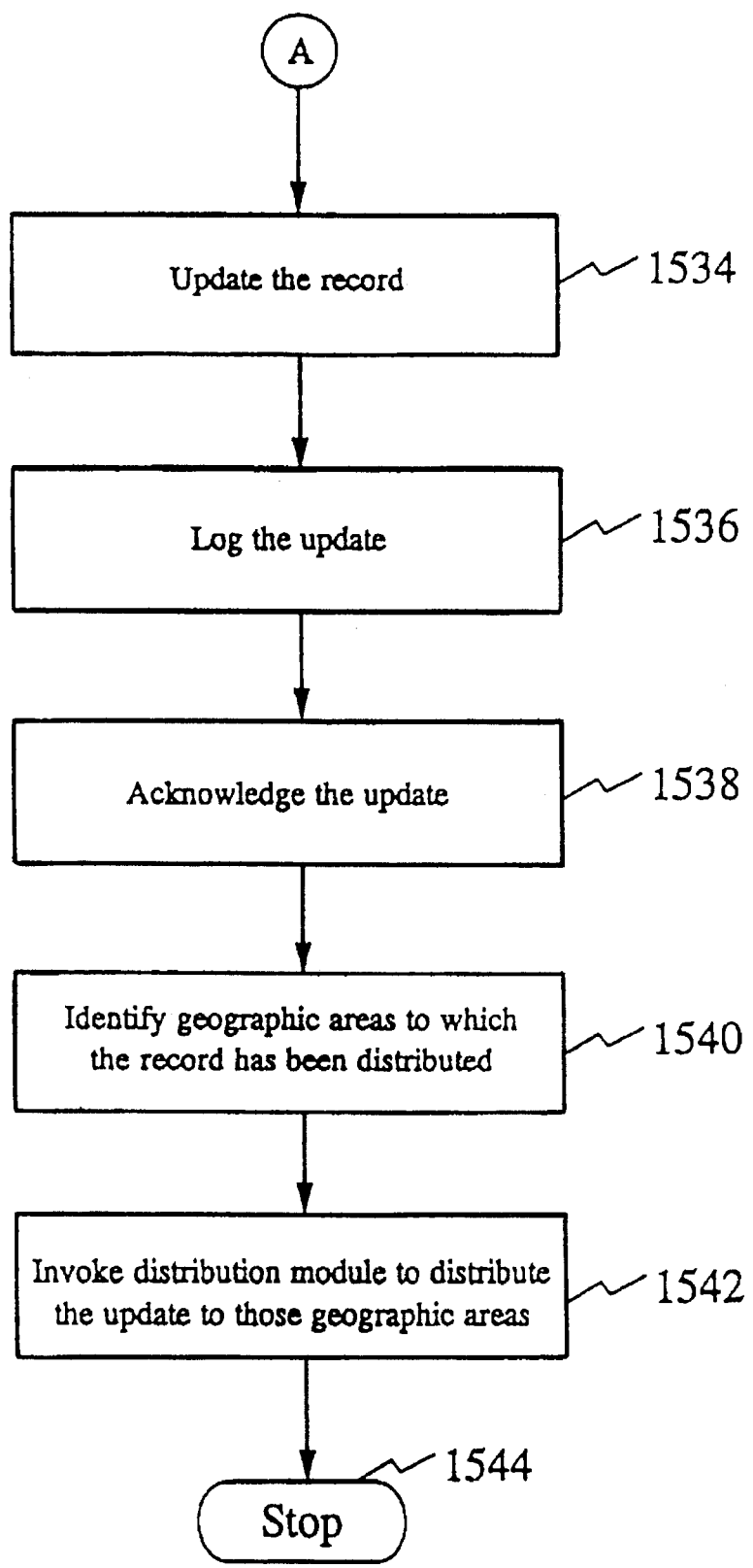

Once the field values have been verified, the update module 1216 updates the record in the global code database 412 (see step 1534 of FIG. 15B). It then has the code maintenance audit module 516 log the update operation (see step 1536). Next, the update module 1216 notifies the user 814 that the record has been successfully updated (see step 1538). The update module 1216 then consults the distribution audit log 522 to identify the geographic areas to which the record has been distributed (see step 1540). Finally, the update module 1216 has the distribution module 520 update the record in the identified geographic areas (see step 1542).

Figure 16:
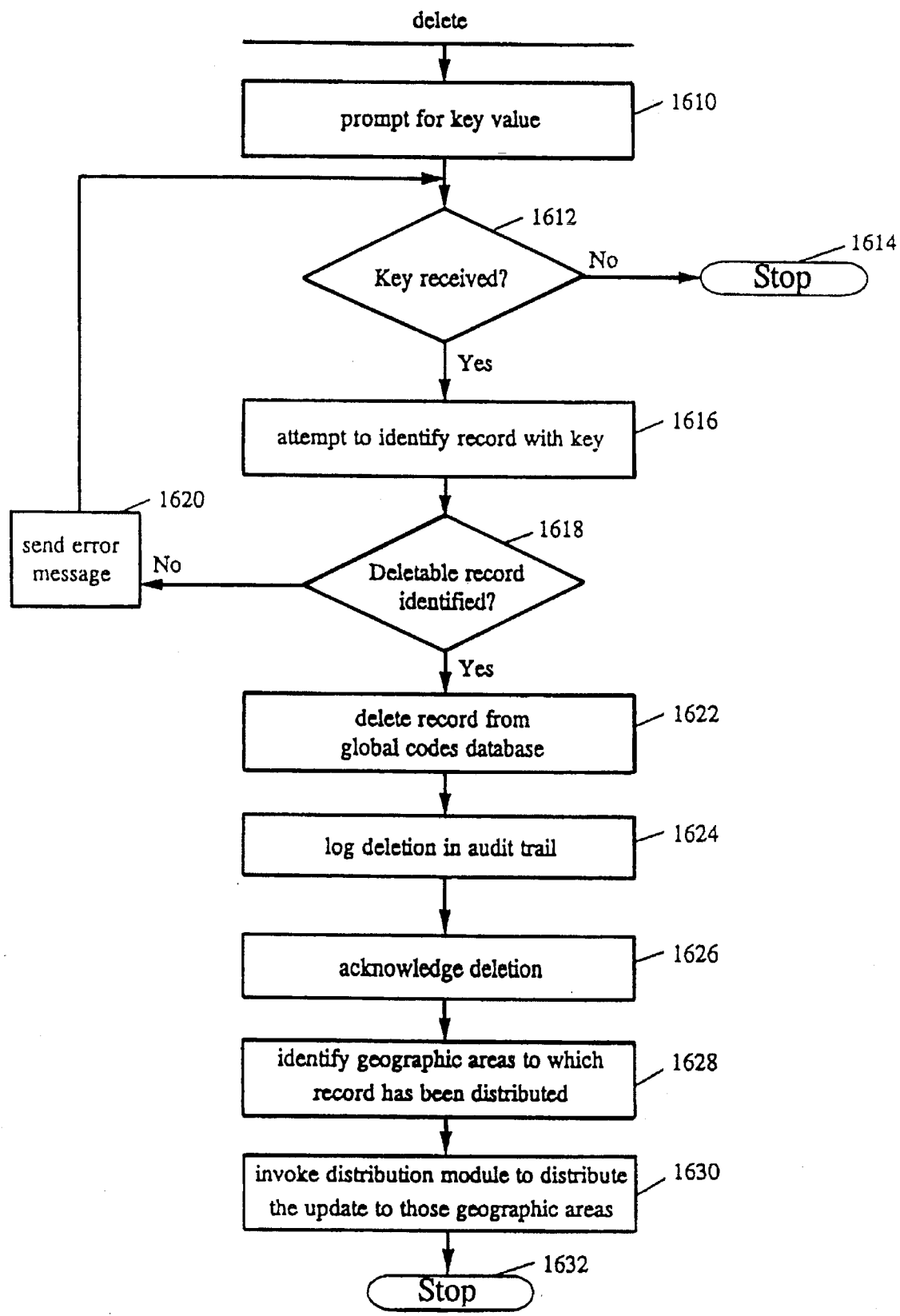
FIG. 16 shows a flowchart which illustrates the operation of a delete module of the code maintenance module of FIG. 12.

FIG. 16 illustrates the operation of the delete module 1218. The delete module 1218 is invoked by the front end 510 upon a request by the user 814 to delete a record. The delete module 1218 begins by prompting the user 814 for a key value (see step 1610). If the user 814 responds by sending a request to terminate, the delete module 1218 stops (see steps 1512 and 1514).

If, on the other hand, the user 814 sends a key value, the delete module 1218 attempts to use the key value to identify a record in the global code database 412 (see step 1612 and 1516). It then determines whether a deletable record has been identified (see step 1618). A deletable record is one which has not been discontinued, has not been outseed, and has a record profile which permits deletion by the user 814. If the key value did not identify a deletable record, then the delete module 1218 sends an error message to the user 814 and returns to step 1612 to receive another key value or a request to terminate (see step 1620).

Once a deletable record has been identified, the delete module 1218 deletes the record from the global code database 412 (see step 1622). It then has the code maintenance audit module 516 log the deletion in the maintenance audit trail (see step 1624), and it notifies the user 814 that the record has been successfully deleted (see step 1626). The delete module 1218 then consults the distribution audit log 522 to identify the geographic areas to which the record has been distributed (see step 1628). Finally, the delete module 1218 has the distribution module 520 delete the record in the identified geographic areas (see step 1630).

The code specific modules 1220 operate as follows. The discontinue module 1222 represents a data operation called "discontinue" which, when invoked on a record, freezes the data contained therein. A discontinued record thus cannot be directly modified by the client 526.

Figure 17:
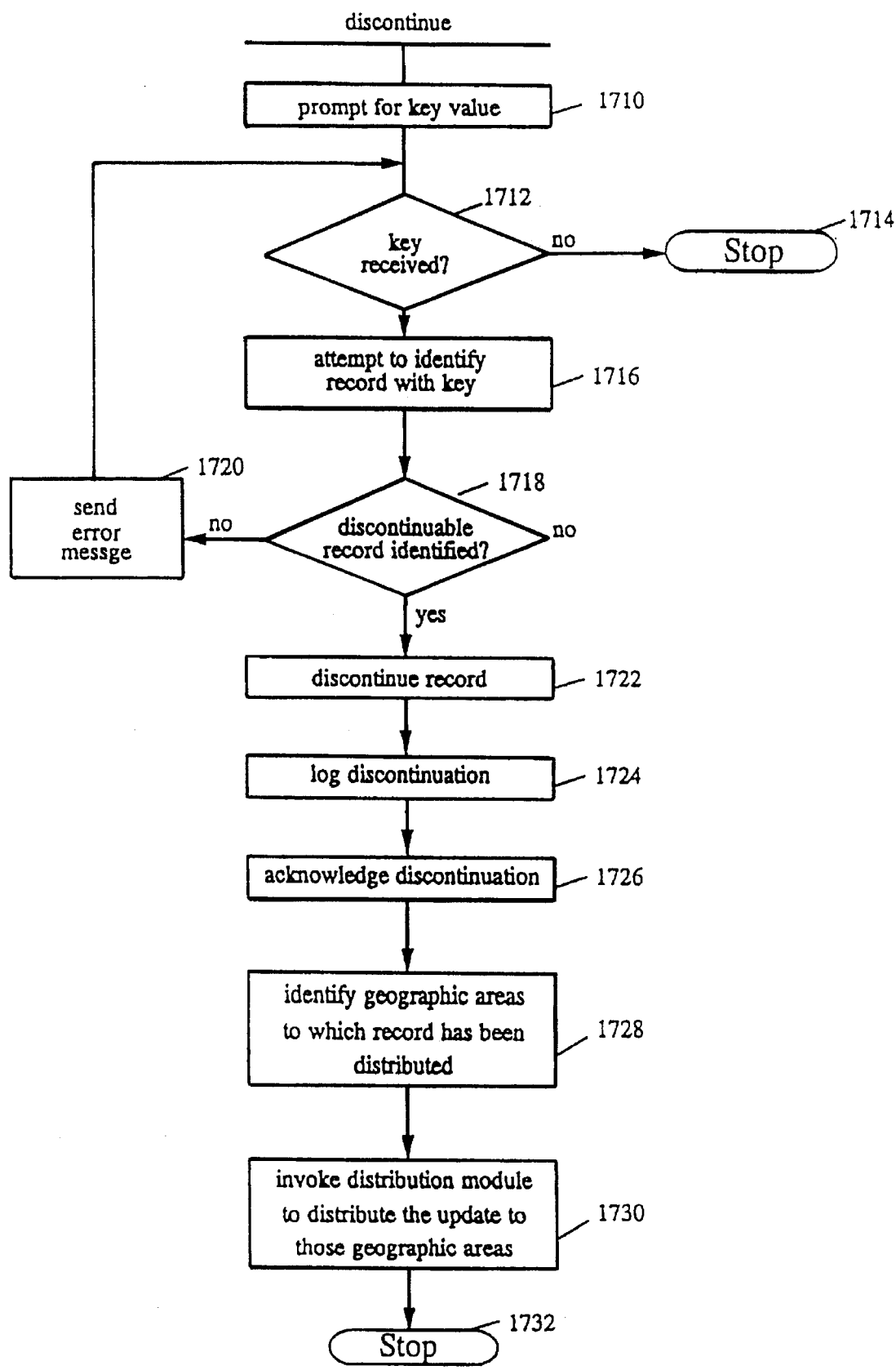
FIG. 17 shows a flowchart which illustrates the operation of a discontinue module of the code maintenance module of FIG. 12.

FIG. 17 illustrates the operation of the discontinue module 1222. The discontinue module 1222 is invoked by the front end 510 upon a request by the user 810 to discontinue a record. The discontinue module 1222 begins by prompting the user 814 for a key value (see step 1710). If the user 814 responds by sending a request to terminate, the discontinue module 1222 stops (see steps 1712 and 1714).

If, on the other hand, the user 814 sends a key value, the discontinue module 1222 attempts to use the key value to identify a record in the global code database 412 (see steps 1712 and 1716). It then determines whether a discontinuable record has been identified (see step 1618). It then determines whether a record which can be discontinued has been identified (see step 1718). A record cannot be discontinued if it is a support record to any base record which is active (i.e., not discontinued) or if its record profile prohibits modification by the user 814. If the key value did not identify a record which the user 814 can discontinue, then the discontinue module 1222 sends the user 814 an error message and returns to step 1712 to receive another key value or a request to terminate (see step 1720).

Once a record which can be discontinued has been identified, the discontinue module 1222 marks the record as discontinued in the global code database 412 (see step 1722). It then has the code maintenance audit module 516 log the discontinuation of the record (see step 1724), and it notifies the user 814 that the record has been successfully discontinued (see step 1726). The update module 1216 then consults the distribution audit log 522 to identify the geographic areas to which the record has been distributed (see step 1728). Finally, the discontinue module 1222 has the distribution module 520 discontinue the record in the identified geographic areas (see step 1730).

The outsee module 1224 represents a data operation called "outsee" which enables historic chaining of a record by providing a cross-reference from it to a record which supersedes it. For example, if company A purchased company B, then a customer record for company B would be discontinued, and a pointer to a customer record for company A would be inserted in the company B record. When an outseed record is requested, the client 526 is notified that the record has been superseded and is referred to the superseding record.

Figure 18:
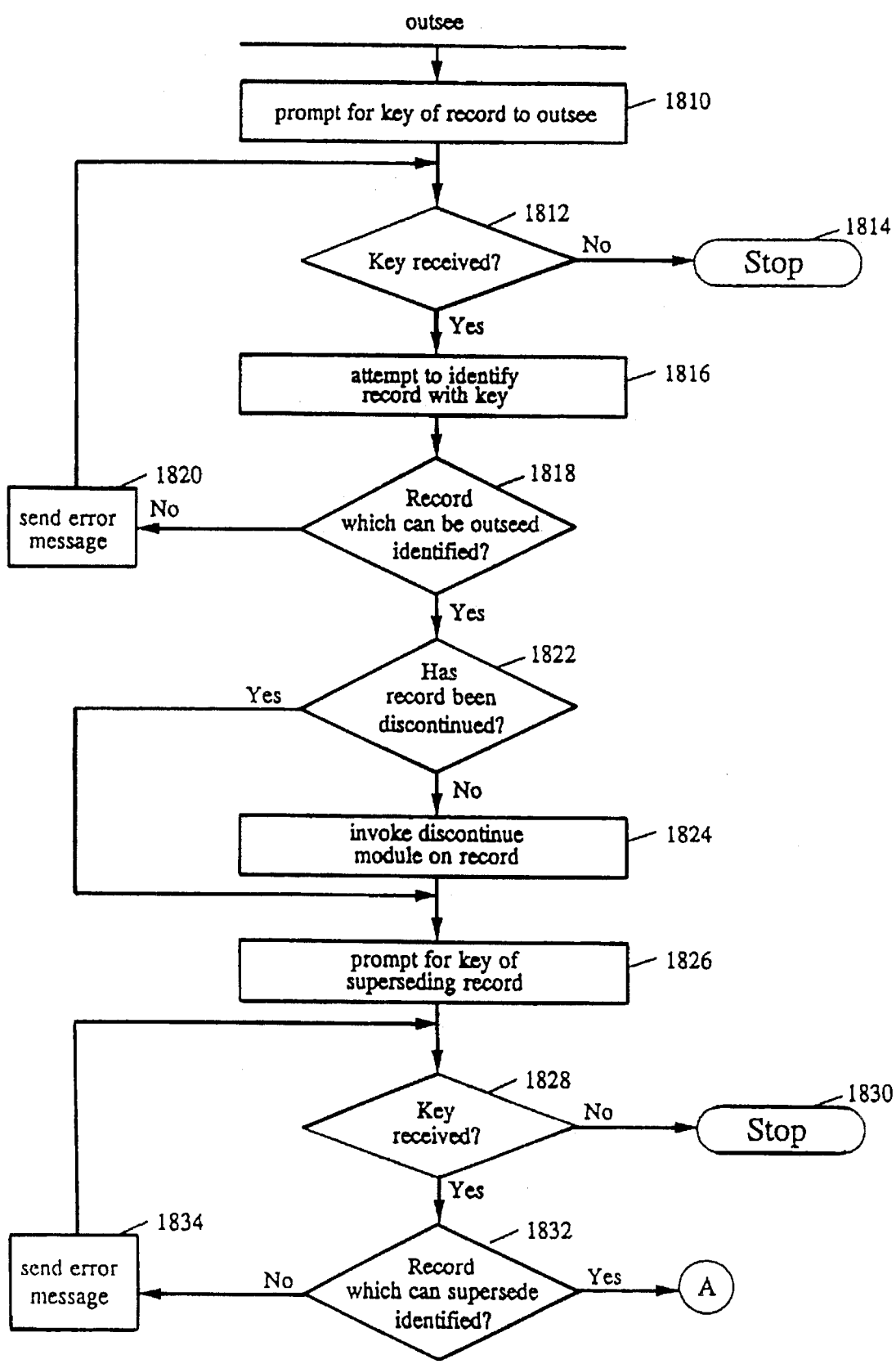
FIGS. 18 and 19 show a flowchart which illustrates the operation of an outsee module of the code maintenance module of FIG. 12.
Figure 19:
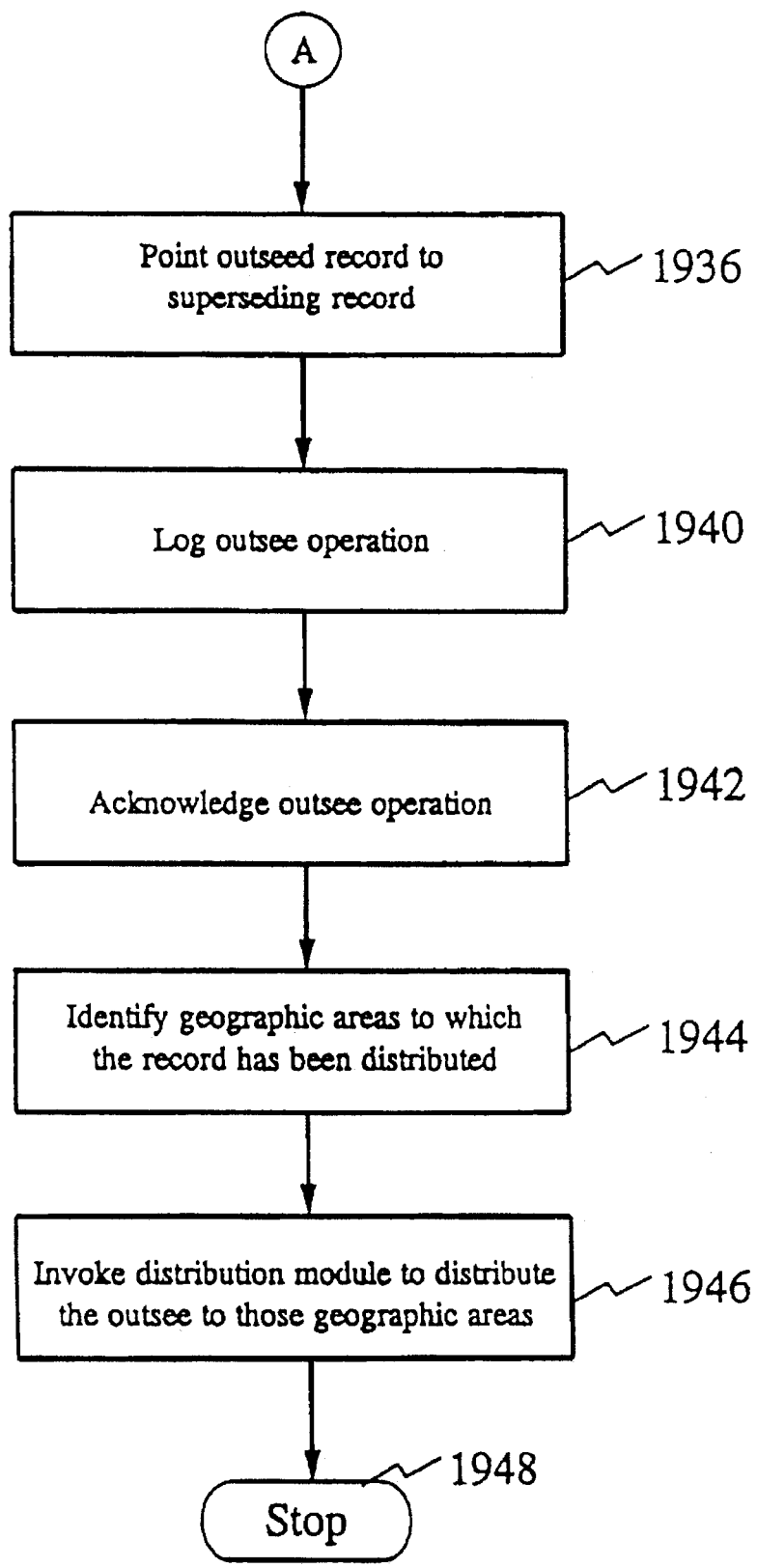

FIGS. 18 and 19 illustrate the operation of the outsee module 1224. The outsee module 1224 is invoked by the front end 510 upon a request by the user 810 to outsee a record. The outsee module 1224 begins by prompting the user 814 for a key value (see step 1810). If the user 814 responds by sending a request to terminate, the outsee module 1224 stops (see steps 1812 and If, on the other hand, the user 814 sends a key value, the outsee module 1224 attempts to use the key value to identify a record in the global code database 412 (see step 1812 and 1816). It then determines whether a record which can be outseed has been identified (see step 1818). A record can only be outseed if its record profile permits modification by the requesting client 526. If the key value did not identify a record which the user 814 can outsee, then the outsee module 1224 sends an error message to the user 814 and returns to step 1812 to receive another key value or a request to terminate (see step 1820).

Once a record which can be outseed has been identified, the outsee module 1224 determines whether the record has been discontinued (see step 1822). If not, it invokes the discontinue module 1222 to discontinue the record, and to log and distribute the discontinuation (see step 1824).

Once the record has been discontinued, the outsee module 1224 prompts the user 814 for the key value of the superseding record (see step 1826). If the user 814 responds by sending a request to terminate, the outsee module 1224 stops (see steps 1828 and 1830). Otherwise, the outsee module 1224 determines whether the key value identifies a record of the same type as the record being outseed (see step 1832). If not, the outsee module 1224 sends an error message to the user 814 and returns to step 1824 to receive another superseding key value or a request to terminate (see step 1834).

Once a superseding record has been identified, the outsee module 1224 modifies the outseed record in the global code database 410 to indicate that the outseed record has been superseded by the superseding record (see step 1936 of FIG. 19). The outsee module 1224 then has the code maintenance audit module 516 log the outsee operation in the maintenance audit trail (see step 1840), and it notifies the user 814 that the record has been successfully outseed (see step 1842).

Next, the outsee module 1224 consults the distribution audit log 522 to identify the geographic areas to which the record has been distributed (see step 1844). Finally, the discontinue module 1222 has the distribution module 520 discontinue the record in the identified geographic areas (see step 1846).

Code Maintenance Audit Trail

An inherent potential hazard of storing all transactional data in a central repository (i.e., the global code database 412) is that a particular record may be accessible by multiple users and through multiple transaction processing systems. This extensive accessibility increases the threat of data corruption by erroneous or malicious data operations. To diminish the threat, as well as to facilitate statistical performance analysis, the code maintenance audit module 516 stores derailed information about each data operation.

Figure 20:
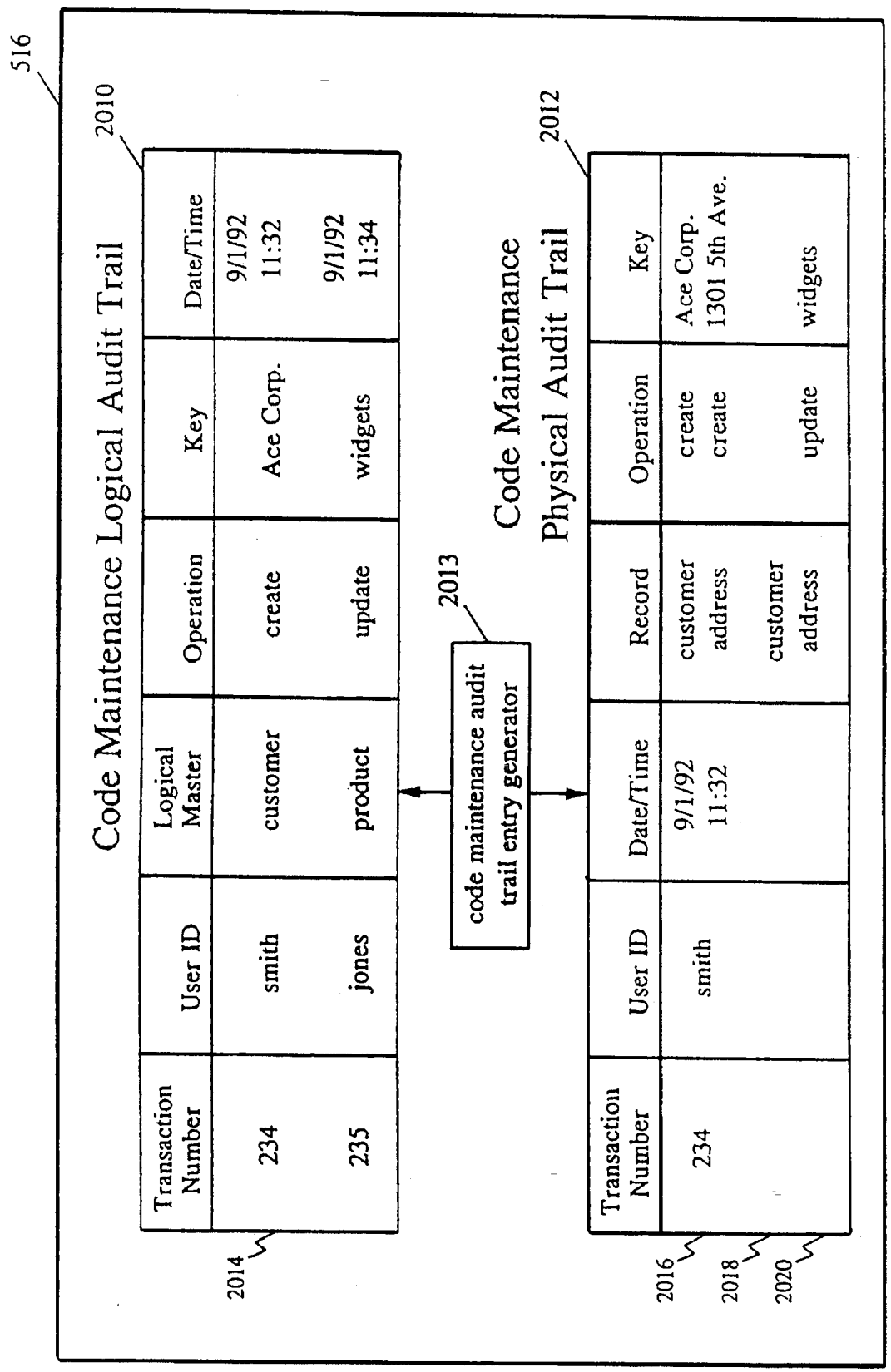
FIG. 20 shows a block diagram which illustrates the structure of an code maintenance audit trail module of the global code system of FIG. 5.

FIG. 20 illustrates the structure of the code maintenance audit module 516, which is made up of a logical maintenance audit trail 2010, a physical maintenance audit trail 2012, and a maintenance audit trail entry generator 2013. The logical maintenance audit trail 2010 accounts for each logical maintenance operation by recording "logical code maintenance data " such as the identity of the requesting user, the logical operation type, the name and key of the logical master record operated upon, and a time stamp. The physical maintenance audit trail 2012 accounts for each physical data operation by recording "physical code maintenance data" such as the physical operation type and the name and key of each physical record operated upon.

A logical record 2014 and physical records 2016, 2018 and 2020 illustrate the relationship between logical records and physical records. The logical record 2014 records a request made by a user in the U.S. named "Jones" to create a new customer record for a company called "Ace Corporation". The request is made on Sep. 1, 1992 at 11:32 a.m. Creation of the new customer logical record involves the creation of a customer physical record, the creation of an address physical record and creation of a new customer-address record. Physical records 2016, 2018 and 2020 record these physical operations. Note that the logical record 2014 and the physical records 2016, 2018 and 2020 all have the same transaction number. A single transaction number for a logical audit record and each associated physical audit record facilitates cross-referencing between logical and physical audit records.

As explained, the code maintenance module 514 logs each code maintenance operation to the maintenance audit trail. The code maintenance module 514 does so by invoking the code maintenance audit trail entry generator 2013 with detailed physical and logical information about the operation. The code maintenance audit trail entry generator 2013 then uses the information to create physical maintenance audit trail entries and a corresponding logical maintenance audit trail entry as illustrated in FIG. 21.

Figure 21:
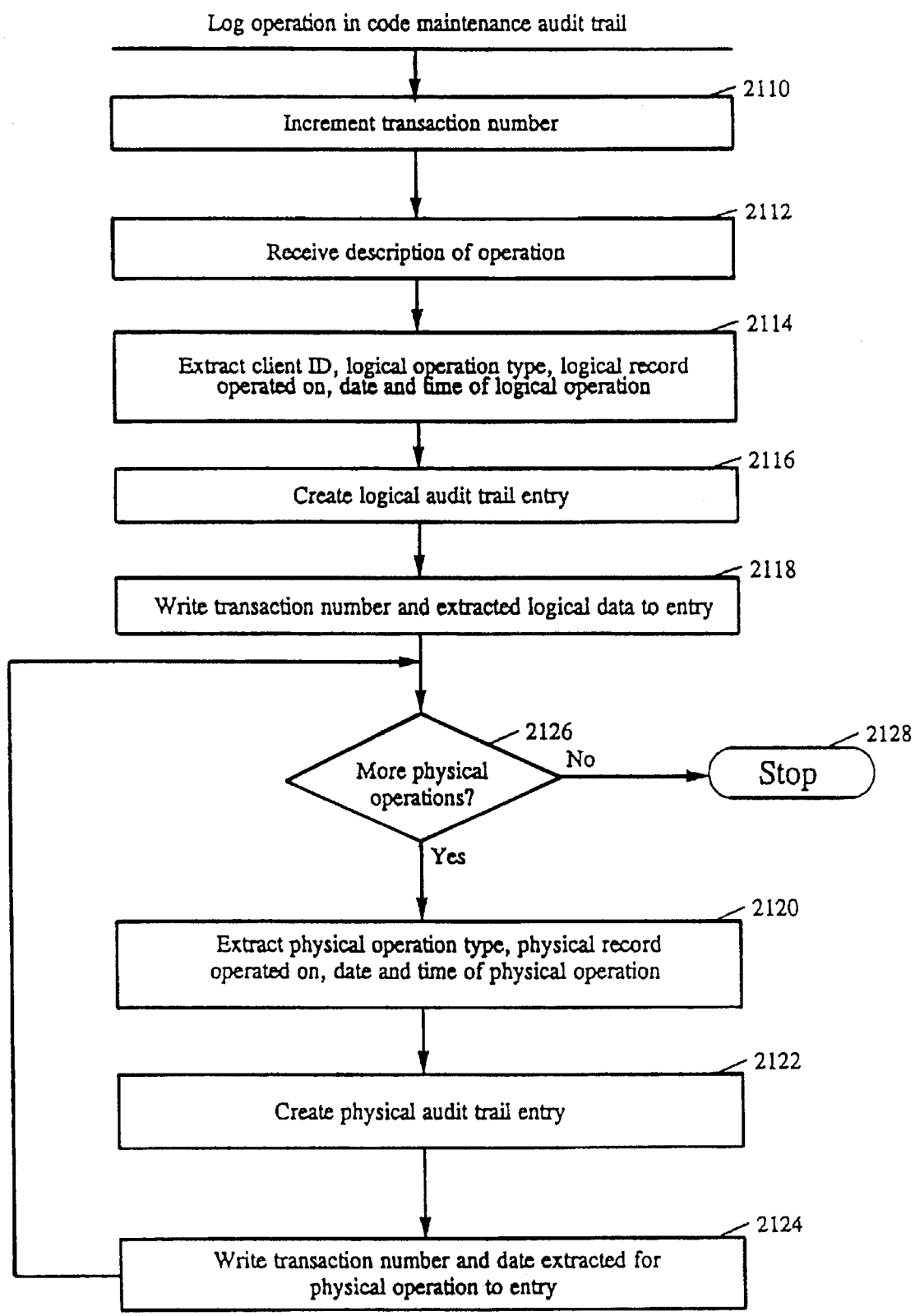
FIG. 21 shows a flowchart which illustrates the operation of the audit trail module of FIG. 20.

Referring to FIG. 21, the code maintenance audit trail entry generator 2013 first increments a transaction number associated with the logical operation (see step 2110). The code maintenance audit trail entry generator 2013 receives from the invoking module the derailed logical and physical information about the operation (see step 2112). It then extracts from the detailed information the identity of the requesting client 526, the logical operation type (i.e., create, read, update, delete, etc.), the name and key of the logical record operated upon, and the date and time the logical operation was performed (see step 2114). Next, the code maintenance audit trail entry generator 2013 creates a logical maintenance audit trail entry and writes the transaction number and extracted data to it (see steps 2116 and 2118).

The code maintenance audit trail entry generator 2013 processes each associated physical operation as follows. First, it extracts from the detailed information the physical operation type, the name and key of the physical record operated upon, and the date and time the physical operation was performed (see step 2120). The code maintenance audit trail entry generator 2013 then creates a physical maintenance audit trail entry, writes the transaction number and extracted physical data to it, and adds the entry to the physical maintenance audit trail (see steps 2122 and 2124). Once it has processed all physical operations specified in the derailed information, the maintenance audit trail entry stops (see steps 2126 and 2128).

Background Transactions

As explained, it is highly desirable to execute most code maintenance operations in real time. Real time execution is impractical, however, if response time is too great. In the transaction processing environment 400 of the present invention, it is contemplated that the response time would be reasonable for the majority of code maintenance operations. Thus the code maintenance module 514 executes in real time when invoked from the front end 510.

Occasionally, however, it may be desirable to perform an "exceptional" operation which accesses a high volume of records and thus requires a substantial amount of time to execute. If the user invoked an exceptional operation from the code maintenance module 514, he would lose access the global code system 410 until completion of the operation.

Accordingly, the background transaction manager 518 enables the user to execute exceptional operations in a background mode, as long as the input to the exceptional operation is determinable before execution. The background transaction monitor operates essentially by receiving from the user an operation and any associated input data and parameters, returning control of the terminal to the user, invoking the appropriate module of the code maintenance module 514 and communicating the input data and parameters to the module. The background transaction manager 518 thereby enables the global code system 410 to handle such maintenance operations in a background mode and thus without sacrificing on-line serviceability. Because the background transaction manager accesses the global codes database 412 through the code maintenance module 514, all security and data integrity restrictions discussed above apply to the code maintenance operations.

Figure 22:
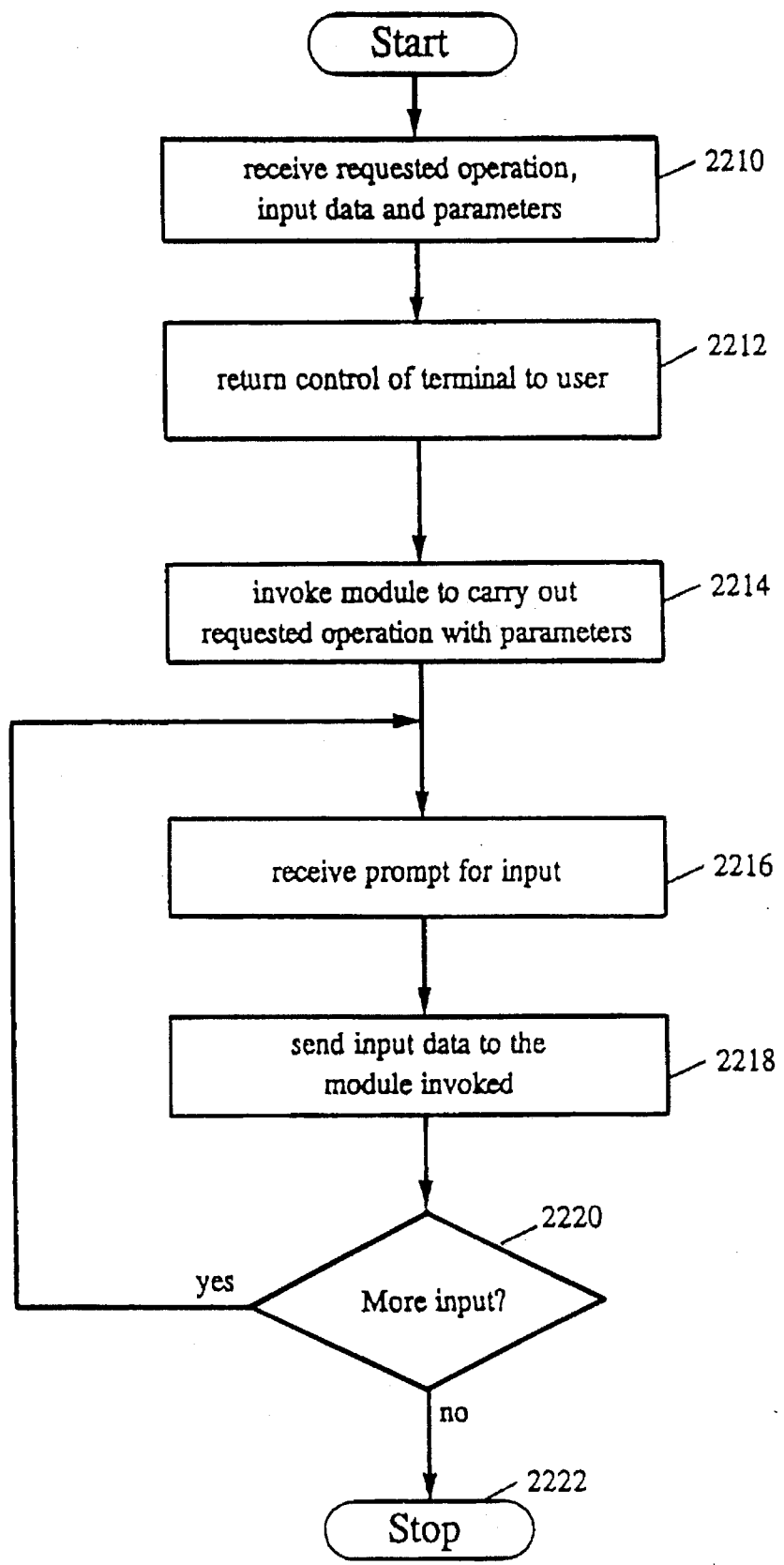
FIG. 22 shows a flowchart which illustrates the operation of a background transaction manager of the global code system of FIG. 5.

FIG. 22 illustrates the high-level method of the background transaction manager 518. First, the background transaction manager 518 receives the request to execute a code maintenance operation in the background, as well as any input data and parameters for the operation (see step 2210). For example, if the request were "background autogen", the input data would specify the field to be updated and the new value of the field. The background transaction manager 518 then immediately returns control of the terminal 814 to the user (see step 2212). The user can thus issue additional requests while the exceptional maintenance operation is executing.

The background transaction manager 518 then invokes the code maintenance module 514 with any specified parameters (see step 2214) and conducts a dialogue with that module to provide it with the input data as the module requests it (see steps 2216, 2218 and 2220). Once the code maintenance module 514 completes execution, the background transaction manager stops (see step 2222).

An example of a background transaction is an autogen operation. In a preferred embodiment of the present invention, the global code database 410 stores most data in best normal form. Because there is only one copy of each field in best normal form, any such field could be modified with the update module 1216. It may be desirable, however, to "denormalize" some fields which are frequently searched or which are essentially static. The autogen operation is used to update denormalized fields.

The autogen operation monitors all record updates. If an update modifies the value of a field that is not stored in best normal form, then the autogen function automatically generates appropriate updates to each instance of the field in the global codes database. It does so by repeatedly invoking the update module to update, log, acknowledge and distribute the value of the field in each record in which it occurs.

A second example of a background transaction is an annual purge operation. The annual purge operation is invoked by a user to delete all records which have been inactive since a specified date (e.g., one year before the present date). The annual purge operation identifies each record which was discontinued on a date previous to the specified date and, for each such record, invokes the delete module to delete it and log, acknowledge and distribute the deletion.

A third example of a background transaction is a mass distribution operation. The mass distribution operation is invoked by the user to distribute a specified set of records to one or more specified geographic areas. Specifically, the mass distribution operation identifies the records in the specified set and then repeatedly invokes the distribute module to distribute (and log and acknowledge the distribution of) each such record.

Distributions

As explained, the global code database 412 stores transactional data, and the transaction processing systems and shadow code systems store subsets of the same data. The distribution module 520 maintains the integrity of the data on the various systems. It does so by distributing messages instructing the appropriate transaction processing systems and shadow code systems to create, update or delete records.

After creating a record, the code maintenance module 514 invokes the distribution module 520 to add the record on the shadow code system and transaction processing systems in the geographic area of the client 526 who requested the creation. The client 526 may invoke the distribution module 520 to distribute the record to the systems in additional geographic areas. After updating or deleting a record, the code maintenance module 514 invokes the distribution module 520 to update or delete the record on all transaction processing and shadow code systems to which the record has been distributed.

Each transaction processing and shadow code system to which the distribution module 520 sends messages to distribute the creation, modification or deletion of a record is called a "distribution target". The collection of messages sent to create, update or delete the record on a particular distribution target is called a "distribution package". The collection of distribution targets in a particular geographic area for a particular distribution is called a "distribution group".

Figure 23:
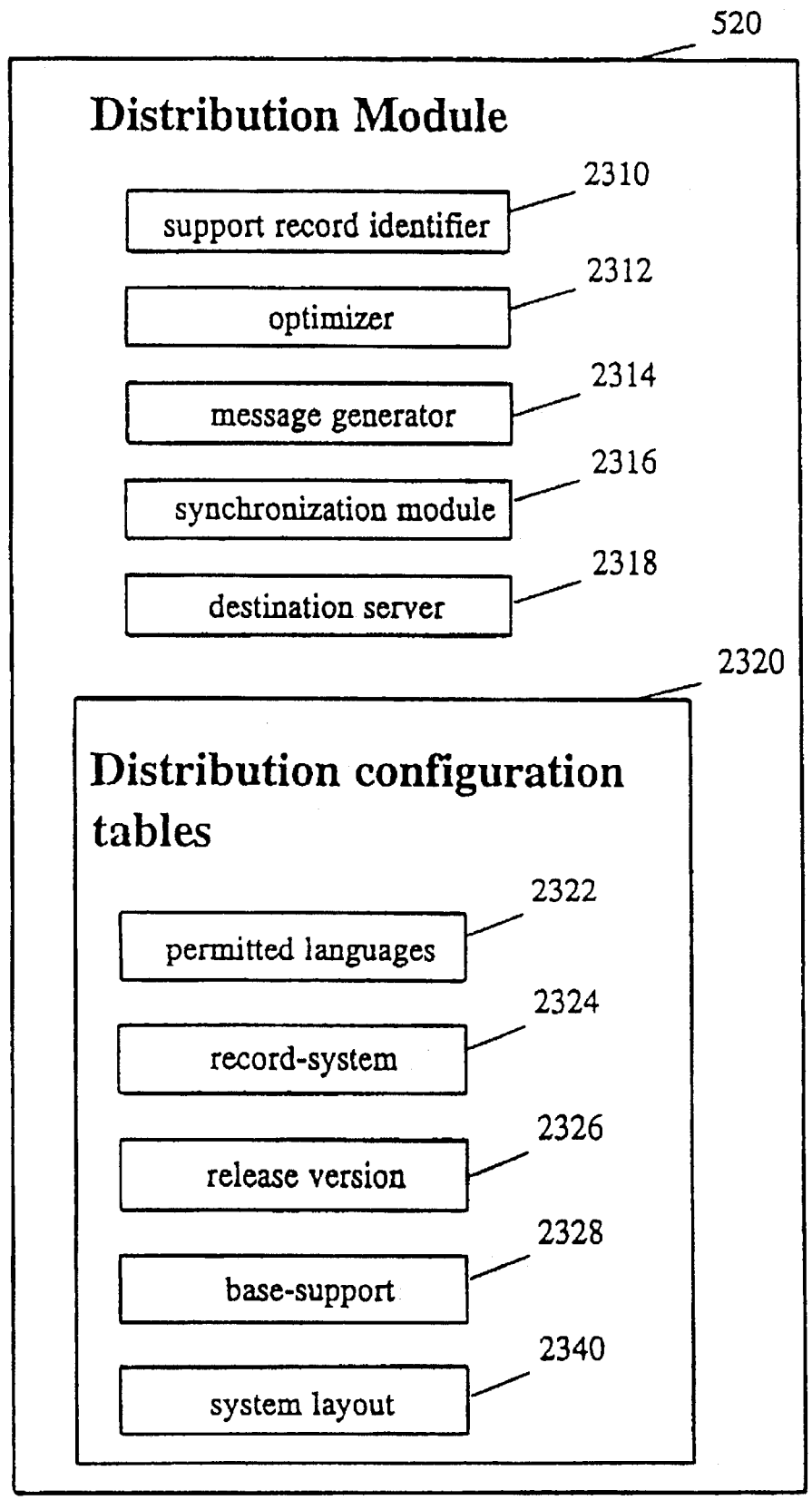
FIG. 23 shows a block diagram of the structure of a distribution module of the global code system of FIG. 5.

FIG. 23 shows the structure of the distribution module 520, which includes a support record identifier 2310, an optimizer 2312, a message generator 2314, a synchronization module 2316, a destination server 2318, and distribution configuration tables 2316. The support record identifier 2310 generates a support tree having all support records of a specified record (including support records of support records of the specified record). The optimizer 2312 selects from the support tree only the support records which have not already been sent to a specified distribution target. The message generator 2314 generates a message to instruct a distribution target to execute a specified command on a specified record. The synchronization module 2316 organizes the messages generated for a particular distribution target so that they are received and executed by the distribution target in the appropriate order. The destination server 2318 sends the messages to the distribution targets.

The distribution configuration tables 2320 include a permitted languages table 2322, a record-system table 2324, a release version table 2326, base-support table 2328 and a system layout table 2340. The permitted languages table 2322 indicates the permissible languages for each distribution target. The record-system table 2324 indicates, for each record, the types of transaction processing systems which maintain it (e.g., accounting, order processing or inventory). The release version table 2322 indicates the release version of the database management system running on each distribution target. The base-support table 2328 indicates all support records for each record. Finally, the system layout table 2340 specifies the physical layout of the transaction processing environment 400.

Figure 24A:
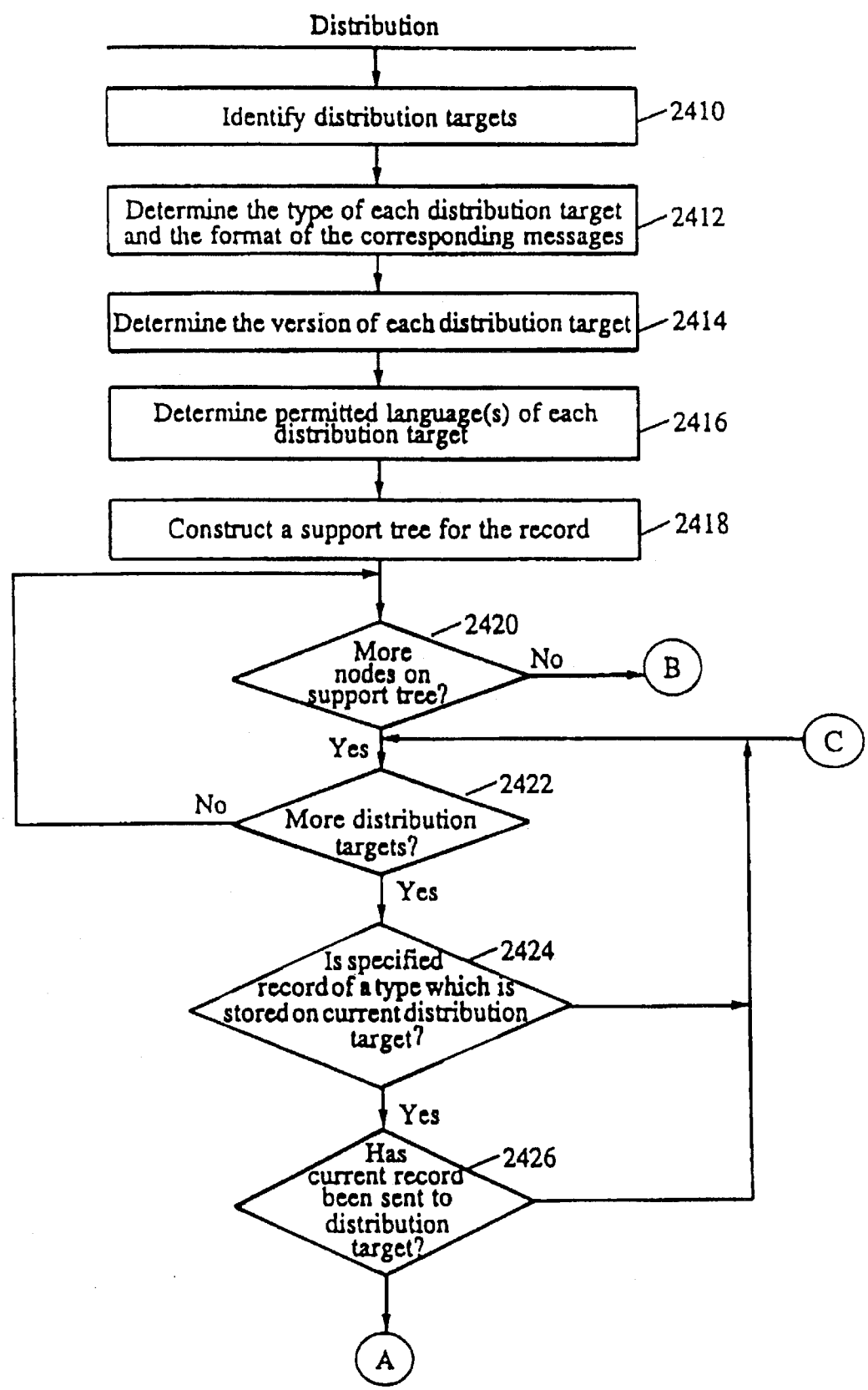
FIG. 24A and 24B show a flowchart which illustrates the operation of the distribution module of FIG. 23.
Figure 24B:
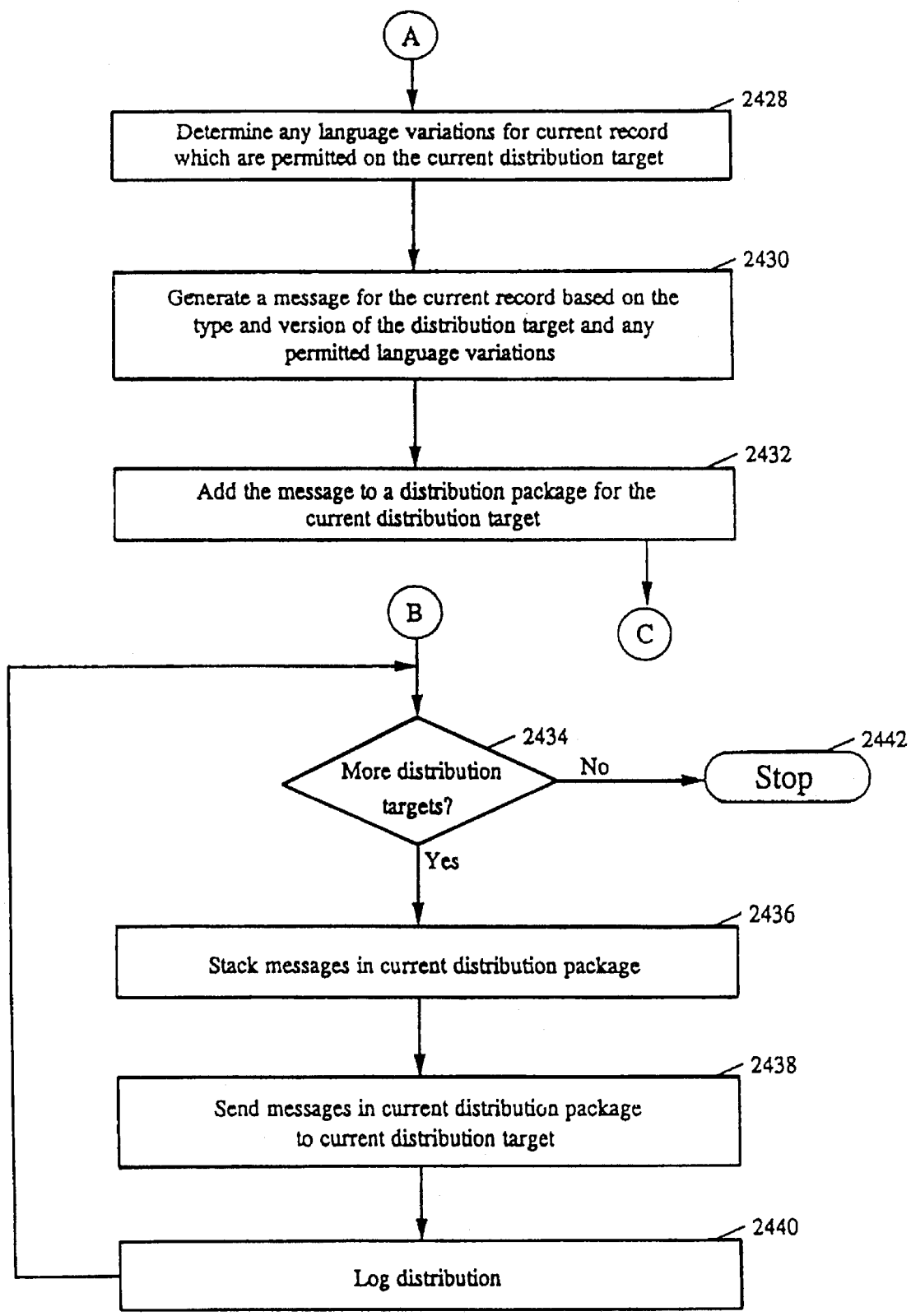

FIGS. 24A and 24B illustrate the method of the distribution module 520. The distribution module 520 is invoked by the code maintenance module 514 or the background transaction manager 578 with a specified record, one or more specified destination areas and a specified code maintenance operation. The code maintenance operation is the operation to be performed on the distribution targets. If invoked by the code maintenance module 514, the operation is the one that module is currently executing on the global code system 410. If invoked directly by the background transaction manager 518 (e.g., in executing a mass distribution), the operation is "create".

Referring to FIG. 24A, the distribution module 520 begins by consulting the system layout table 2340 to identify all possible distribution targets (see step 2410). That is, it identifies all shadow code systems and transaction processing systems in the specified destination area or areas.

The distribution module 520 next determines the type of each of the distribution targets identified in step 24 10. That is, it determines whether each is, for example, a shadow code system, an order processing system, an accounting system or an inventory system. Based on the target types, the distribution module determines the proper message formats. (See step 2412).

The distribution module 520 then consults the release version table 2326 so as to determine the version of the database management system on each distribution target (see step 2414).

Next, the distribution module 520 consults the permitted languages table 2322 to determine the permitted language or languages of each of the distribution targets.

The support record identifier 2310 then generates a support tree for the specified record (see step 2418). The root node of the support free represents the specified record. The child nodes of the root represent all records which directly support the specified record. In general, child nodes of each node on the support tree represent the records which immediately support the records represented by that node. Any node which has no child node represents a record which has no support records. Such a node is called a leaf node. The support tree is generated by consulting the base-support table 2328 in a recursive manner.

The optimizer 2312 processes each node on the support tree as indicated in steps 2422 through 2432 (see step 2420). First, for each distribution target identified in step 24 10, the optimizer 2312 carries out steps 2424 through 2432 (see step 2422). In step 2424, the optimizer 2312 consults the record-system table 2324 to determine whether the specified record is of a type which is maintained by the current distribution target. If not, then control of flow returns to step 2422 to process additional distribution targets.

If, on the other hand, the specified record is of a type which is maintained by the current distribution target, then the optimizer 2312 next determines whether the record associated with the current node has been sent to the current distribution target (see step 2426). It makes that determination by consulting the distribution audit module 522. If so, then control of flow returns to step 2422 to process additional distribution targets.

If, on the other hand, the current record has not been sent to the current distribution target, then the message generator 2314 generates a message for the current record as illustrated by steps 2428 through 2432. In step 2428, the message generator 2314 consults the permitted languages table 2322 and the fields of the current record to identify any language variations for field values which are permitted on the current distribution target. The message generator 2314 then generates a message for the current record which is formatted according to the type and release version of the distribution target (see step 2430). The message contains instructions which the distribution target will interpret to perform the specified operation on the specified record, and to include any appropriate language variations. Once generated, the message is added to a distribution package for the current distribution target (see step 2432).

Once all of the nodes on the support tree have been processed (in steps 2422 through 2432), the distribution module 520 processes each distribution package as shown in steps 2436 through 2432 (see step 2434). In step 2436, the synchronization module 2316 stacks the messages in a current distribution package so that the order in which the messages are sent is the reverse of the order in which the messages were generated (see step 2436). This ensures that a message for a particular record will only be sent after all of that record's direct and indirect support records have been sent. The destination server 2318 then sends the messages to the current distribution target (see step 2438). Finally, the distribution module 520 invokes the distribution audit module 522 to log the messages sent. The distribution module 520 stops once it has processed all of the distribution packages (see step 2442).

Exceptional Error Management

Exceptional errors may arise during the execution of the global code system 410. An exceptional error falls into one of three classes. First, an infrastructure error results from a malfunctioning component of the infrastructure of the transaction processing environment 400. Examples of infrastructure errors include an unsuccessful distribution resulting from a communication line which is down or a distribution target which is unavailable. The second type of exceptional error is a database-related error such as an unsuccessful create or update due to a lack of sufficient space on the global codes database 412. The third type of exceptional error is an unrecoverable application error such as a program flow entering an unexpected state or a request to load a table with more data that it can hold.

Figure 25:
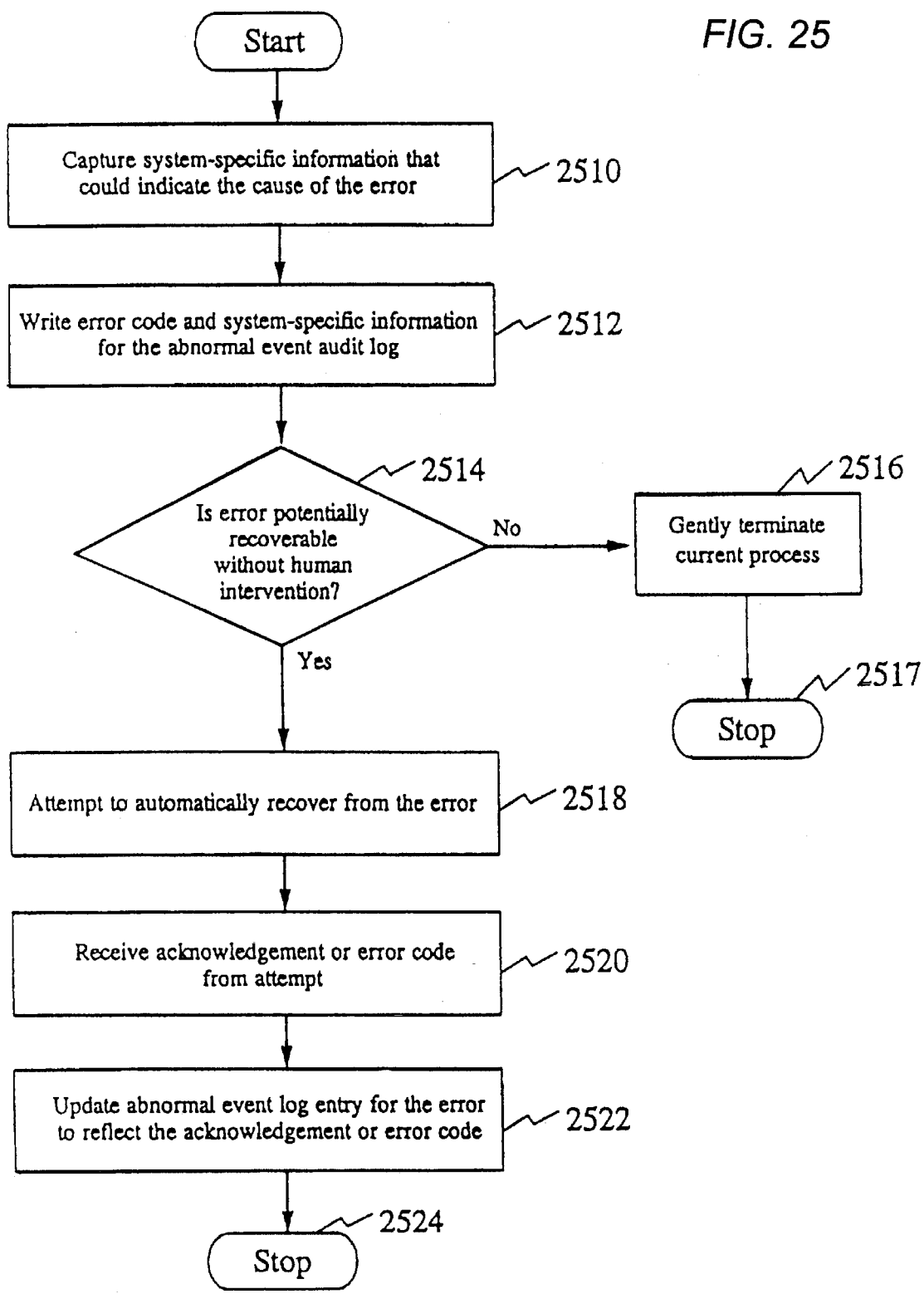
FIG. 25 shows a flowchart of the operation of an error management system of the global code system of FIG. 5.

Exceptional errors are not generally recoverable by the user, and are thus specially handled by the error management module 524. FIG. 25 illustrates the operation of this module. The error management module 524 is invoked with an error code. The module responds by first capturing a snapshot of certain system specific information which may be helpful in determining the cause of the error or in determining how to recover from it (see step 2510). The error management module 524 next writes the error code and the system-specific information to the abnormal events audit log 525 (see step 2512).

Certain kinds of exceptional errors can potentially be recovered from without human intervention. In step 2514, the error management system 524 analyzes the error code and possibly the system specific information to determine whether the current error is potentially automatically recoverable. If not, the error management system 524 gently terminates the process in which the error occurred (see steps 2516 and 2517).

Otherwise, the error management system 524 carries out steps 2518–2522 as follows. In step 2518, the error management system 524 attempts to automatically recover from the error. For example, if the error was an unsuccessful distribution due to a communication line which is down, the attempt may involve sending the distribution package over an alternate communication line. Alternatively, if the error was an unsuccessful distribution due to a distribution target which is currently not available, the attempt may involve invoking the destination server 2318 to repeatedly attempt to send the distribution package at specified time intervals until distribution is successful.

Finally, the error management system 524 receives either an acknowledgement of the successful termination of the recovery attempt or a second error code (see step 2520), and updates the entry for the error in the abnormal event audit log 525 accordingly.

An administrative user periodically reviews the abnormal event audit log 525 and attends to any entries which have not been automatically resolved. The administrative user also looks for recurring exceptional errors in the abnormal events audit log 525. Such errors can indicate bugs in the global code system, malfunctions in the transaction processing environment, and ways to improve performance and robustness.

Sample Transaction

A sample transaction entered on the global code system 410 clarifies the interrelationship between the various modules shown in FIG. 5. The sample transaction involves modifying the customer record 710 of FIG. 7.

Figure 26:
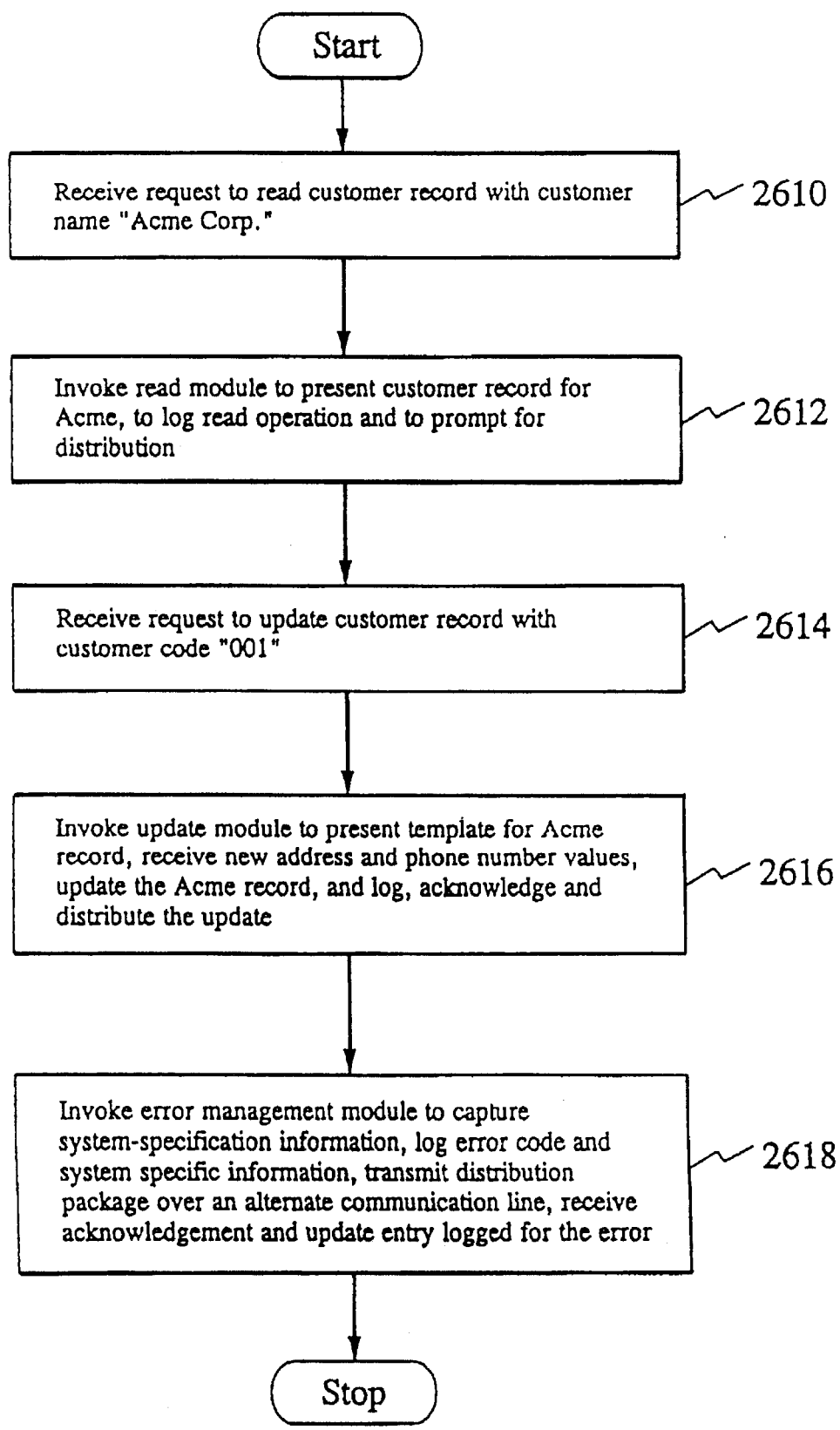
FIG. 26 shows a derailed flowchart of the sample transaction of FIG. 2 carried out on the global code system of FIG. 5.

FIG. 26 shows a high-level flowchart of the entry of the sample transaction. Before entering the transaction, the user 814 must log onto the machine on which the global code system 410 is running and invoking the global code system 410 through the front end 510 (as explained in FIGS. 9A and 9B and the text accompanying those figures). The user 814 is then presented with a menu from which he can select a command.

Referring now to FIG. 26, the user 814 begins the sample transaction by selecting to read a customer record that has "Acme Corp." as its customer name field (see step 2610). The global code system 410 satisfies the request by invoking the read module to: (1) present the customer record 710, (2) log the read operation, and (3) prompt the user 814 to specify any distribution targets.

The user 814 does not request further distribution of the customer record 710. Instead, the user 814 issues a request to update the record having the key "001", i.e., the customer code 711 of the customer record 710 (see step 2614). The update module 1216 is then invoked to present a template for the record. According to the sample transaction, the user 814 then enters on the template a new headquarters address 714, purchasing address 716, accounting address 718 and receiving address 720, as well as new telephone numbers for the headquarters contact 722, the purchasing contact 724, the accounting contact 726, and the receiving contact 728. The update module 1216 then updates the customer record 710 and logs, acknowledges and distributes the update (see step 2616).

Assuming for illustration that the distribution of step 2616 was not distributed to the U.S. inventory system 112 because of a bad communication line, the error management module 524 is then invoked with the error code generated. The error management module 524 then: (1) captures system specific information that may assist in recovering from the error, (2) logs the error code and the system specific information in the abnormal event log 525, and (3) invokes the distribution module 520 to send the distribution package to the U.S. inventory system 112 via an alternate communication line. Assuming this transmission is successful, the error management module 524 then receives an acknowledgement from the U.S. inventory system 112 and updates the entry in the abnormal event log 525 so that the entry indicates that the error has been automatically recovered from (see step 2618).

Conclusion

While various embodiments of the present invention have been described above, it should be understood that they have been presented by way of example only. Thus, the breadth and scope of the present invention should not be limited by any of the above-described exemplary embodiments, but should be defined only in accordance with the following claims and their equivalents.

What is claimed is:

1. A computer-based method which enables a client to maintain reference codes on multiple transaction processing systems in a transaction processing environment, the method comprising the steps of:

(1) receiving from the client a code maintenance request to carry out a code maintenance operation;

(2) if said request is a request to create a record, then
receiving a field value of said record from said request,
creating said record with said field value on a global code database of a global code system, and
distributing a create message to a distribution target, wherein said create message instructs said distribution target to create a copy of said record with said field value on an associated target database;

(3) if said request is a request to read said record, then
receiving a query,
retrieving, from said global code database, said record identified by said query, and
presenting values of said record to the client;

(4) if said request is a request to update said field value of said record, then
receiving an updated field value of said record,
updating said field value in said global code database with said updated field value, and
distributing an update message to said distribution target, wherein said update message instructs said distribution target to update said copy of said record on said associated target database; and (5) if said request is a request to delete said record, then
deleting said recoil from said global code database, and
distributing a delete message to said distribution target, wherein said delete message instructs said associated target database to delete said copy of said record on said target database, wherein said code maintenance operation is carried out on said record in said global code database before being carried out on said copy of said record in any of said target databases of the multiple transaction processing systems.

2. The method of claim 1, wherein if said request is a request to discontinue said record, then marking said record on said global code database to indicate that said field values cannot be changed by said client.

3. The method of claim 1, wherein if said request is a request to outsee said record to a superseding record, then inserting in said record on said global codes database a pointer to said superseding record, and distributing an outsee message instructing said associated target database to insert said pointer in said copy of said record on said target database.

4. The method of claim 1, further comprising the steps of:

receiving standardized input from a user;

extracting said request from said standardized input;

generating standardized output from said values of said record retrieved in step (3); and sending said standardized output to said user.

5. The method of claim 1, further comprising the steps of:

receiving standardized input from an external application;

extracting said request from said standardized input;

generating standardized output from said values of said record retrieved in step (3); and sending said standardized output to said external application.

6. The method of claim 1, further comprising the steps of:

determining a security profile of said client; and carrying out said code maintenance operation only if said code maintenance request is permitted by said security profile.

7. The method of claim 1, further comprising the steps of:

determining a record profile of said record; and carrying out said code maintenance operation only if said code maintenance request is permitted by said record profile.

8. The method of claim 1, further comprising the steps of:

determining a record profile of said record; and carrying out said code maintenance operation only if said field value received is within a range permitted by said record profile.

9. The method of claim 1, further comprising the step of logging said code maintenance operation on a logical code maintenance operation audit trail.

10. The method of claim 9, further comprising a step of logging each component physical code maintenance operation of said code maintenance operation on a physical code maintenance operation audit trail.

11. The method of claim 1, further comprising the steps of:

generating an acknowledgement if said code maintenance operation terminates successfully, and generating an error code if said code maintenance operation does not terminate successfully.

12. The method of claim 1, wherein if said request is a request to perform said code maintenance operation in a background mode, then:

asynchronously carrying out said code maintenance operation; and receiving any additional code maintenance request operation before completion of said code maintenance operation.

13. The method of claim 1, wherein said distributing step of steps (2), (4) and (5) comprises the steps of:

generating a base message to instruct said distribution target to perform a distribution operation on said record;

identifying any support record, wherein said support record either directly or indirectly supports said record;

generating a support message to instruct said distribution target to perform said distribution operation on said support record;

stacking said base message and each said support message in a distribution package so that no relative base message associated with a relative base record occurs in said distribution package before a relative support message associated with relative support record, wherein said relative support record is a support record of said base record; and sending said distribution package to said distribution target.

14. The method of claim 13, wherein said step of generating said support message comprises the step of determining whether a support message associated with a selected support record has been sent to said distribution target and, if not, then generating said support message.

15. The method of claim 1, wherein said distributing step of steps (2), (4) and (5) comprises the steps of:

identifying a destination area of the transaction processing environment from which said request was issued; and selecting as said distribution target a transaction processing system in said destination area wherein said distribution target maintains a file associated with said record.

16. The method of claim 1, wherein said distributing step of steps (2), (4) and (5) comprises the steps of:

identifying a destination area from which said request was made; and selecting as said distribution target a shadow code system in said destination area.

17. The method of claim 1, further comprising the step of logging said distributing step of steps (2), (4) and (5) on a distribution audit trail.

18. The method of claim 1, further comprising the steps of:

receiving a distribution request to perform a distribution operation on said record;

receiving a destination area; and distributing a distribution message to said distribution target in said destination area, wherein said distribution message instructs said distribution target to perform said distribution operation on said copy of said record on said associated target database.

19. The method of claim 1, wherein said distributing step of step(s) (2), (4) and (5) comprises the step of generating a distribution message, wherein said distribution message instructs said distribution target to perform a distribution operation on said record so that said field values of said copy of said record include any language variations that comply with language restrictions of said distribution target.

20. The method of claim 1, wherein said distributing step of step(s) (2), (4) and (5) comprises the step of generating a distribution message, wherein said distribution message instructs said distribution target to perform a distribution operation on said record and wherein said distribution message is formatted according to a release version of said distribution target.

21. The method of claim 1, further comprising the steps of:

detecting an exceptional error during said code maintenance operation;

capturing system-specific information; and writing an indication of said exceptional error and said system-specific information to an abnormal event audit trail.

22. The method of claim 21, further comprising the steps of:

analyzing said exceptional error and said system-specific information to determine whether said exceptional error is potentially recoverable without human intervention, and, if it is, then attempting to recover from said error;

determining whether said attempt was successful; and writing an indication of whether said attempt was successful to said abnormal event audit trail.

23. A computer-based system which maintains codes on multiple transaction processing systems in a transaction processing environment, comprising:

a global code database;

a distribution module which generates a message to instruct a distribution target in a destination area of one of the transaction processing systems to perform a distribution operation on a record; and a code maintenance module having:

a create module having means for creating said record on said global code database and means for invoking said distribution module to instruct said distribution target to create a copy of said record on a target database associated with said distribution target, wherein a field value of said record is specified by a client, a read module having means for retrieving said record from said global code database using a query specified by said client, and means for presenting said record, an update module having means for updating said record in said global code database, and means for invoking said distribution module to instruct said distribution target to update said copy of said record in said target database, wherein said record and said field value am specified by said client, and a delete module having means for deleting said record from said global code database, and means far invoking said distribution module to instruct said distribution target to delete said copy of said record from said target database, wherein said record is specified by said client, wherein said code maintenance module operates on said record in said global code database before said distribution target operates on said copy of said record in any of said target databases of the multiple transaction processing systems.

24. The system of claim 23, wherein said code maintenance module further comprises a discontinue module having means for marking said record on said global code database to indicate that said field value cannot be changed by said client, wherein said record is specified by a client.

25. The system of claim 23, wherein said code maintenance module further comprises an outsee module having means for inserting in said record on said global codes database a pointer to a superseding record, wherein said record and said superseding record are specified by said client, and means for invoking said distribution module to instruct said distribution target to insert said pointer in said record on said target database.

26. The system of claim 23, further comprising a front end which handles communication between said client and said code maintenance module, said front end having:

receiving means for receiving input from said client;

means for extracting a request from said input;

invoking means for invoking a module of said code maintenance module, wherein said module is specified by of said request;

means for receiving output from said code maintenance module, and presenting means for presenting said output to said client.

27. The system of claim 26, wherein said front end comprises a computer interface which receives standardized request messages from an external application and sends standardized output messages to said external applications.

28. The system of claim 26, wherein said front end comprises a user interface which receives standardized requests from a user and sends standardized presentations to said user.

29. The system of claim 26, further comprising a security module having a security profile table, means for consulting said security profile table to determine authorized code maintenance operations, wherein said client is authorized to invoke said authorized code maintenance operations, and means for enabling said invoking means if said client is authorized to invoke said requested module.

30. The system of claim 23, further comprising a security module having a security profile table that indicates a security profile for each client authorized to use the system, means for consulting said security profile table to determine whether said client is authorized to invoke a requested module of said code maintenance module, and means for preventing said requested module from being invoked if said client is not authorized to invoke said requested module.

31. The system of claim 23, further comprising a security module having a record profile table which has entries for records maintained in the system, means for consulting said record profile table to determine whether a requested module of said code maintenance module is permitted to carry out a requested action on said record, and, if not, then preventing said requested module from carrying out said requested action.

32. The system of claim 23, further comprising a code maintenance audit log module which is invoked by said code maintenance module with physical code maintenance data, said audit log module comprising:

a physical code maintenance audit trail, and means for writing said physical code maintenance data to said physical code maintenance audit trail.

33. The system of claim 32, wherein said code maintenance audit log module further comprises:

a logical code maintenance audit trail, means for extracting logical code maintenance data from said physical code maintenance data, and means for writing said logical code maintenance data to said logical code maintenance audit trail.

34. The system of claim 23, further comprising:

means for generating an acknowledgement if a requested module of said code maintenance module terminates successfully, and means for generating an error code if said requested module generates or detects an error.

35. The system of claim 23, further comprising a background transaction manager which is invoked if said client requests performance of a code maintenance operation in a background mode, said background transaction manager having:

means for receiving input data entered by said client;

means for invoking a requested code maintenance module to carry out said code maintenance operation in the background; and means for asynchronously communicating said input data to said requested module.

36. The system of claim 23, wherein said distribution module comprises:

message generating means for generating a base message to instruct said distribution target to perform a distribution operation on said record, and generating, for each support record that supports said record, a support message to instruct said distribution target to perform said distribution operation on said support record;

synchronization means for stacking said base message and each said support message in a distribution package so that each relative base message follows each relative support message, where said relative base message is a message associated with a relative base record, said relative support message is a message associated with a relative support record, and said relative support record supports said relative base record; and destination server means for sending said distribution package to said distribution target.

37. The system of claim 36, wherein said distribution module further comprises:

support record identifying means for consulting a base-support table to identify any support record, wherein said support record either directly or indirectly supports said record;

a base-support table which identifies support records that support records in said global codes database; and support record identifying means for consulting said base-support table to identify said support records that support said record.

38. The system of claim 23, wherein said distribution module comprises:

a system layout table which identifies a potential distribution target in each said destination area; and means for consulting said system layout table to identify said distribution target.

39. The system of claim 23, further comprising a distribution audit log which records said distribution operation.

40. The system of claim 39, wherein said distribution module further comprises:

optimizing means for consulting said distribution audit log to determine whether support record that supports said record has been sent to said distribution target; and means for causing a support message to be generated and sent to said distribution target if said support record has not been sent to said distribution target, wherein said support message instructs said distribution target to perform said distribution operation on said support record.

41. The system of claim 23, wherein said distribution module comprises:

a permitted languages table that indicates acceptable language variations for said distribution target; and message generating means for identifying any language variation in said field of said record, and including said language variation in said message if said language variation is acceptable for said distribution target.

42. The system of claim 23, wherein said distribution module comprises:

a release version table which indicates a release version of said destination target, and message generating means for consulting said release version table and generating said message in a format that complies with said release version.

43. The system of claim 23, further comprising:

means for detecting an exceptional error;

means for capturing system-specific information associated with said exceptional error;

an abnormal event log;

means for writing an indication of said exceptional error and said system-specific information to said abnormal event log.

44. The system of claim 43, further comprising an error management module having:

means for analyzing said exceptional error and said system-specific information to determine whether said exceptional error is potentially recoverable without human intervention;

means for attempting to recover from said exceptional error if said exceptional error is recoverable without human intervention;

means for determining whether said attempt to recover was successful; and means for writing an indication of whether said attempt to recover was successful to said abnormal event audit trail.

45. A computer-based system for maintaining codes across multiple transaction processing systems, comprising:

a global code database for maintaining a master list of records;

modification means for modifying a record in said global code database in response to a code maintenance request from one of the multiple transaction processing systems; and distribution means for distributing a local copy of said modified record from said global code database to said requesting one of the multiple transaction processing systems and to any other ones of the multiple transaction processing systems which use said modified record, wherein said record is modified in said global code database before said local copy of said modified record is distributed to any of the multiple transaction processing systems.

46. The computer-based system of claim 45, wherein said modification means comprises:

a create module having means for creating a record in said global code database and means for invoking said distribution means to instruct a distribution target of a transaction processing system to create a local copy of said record on a target database associated with said distribution target;

a read module bring means for retrieving a record from said global code database using a query specified by a client;

an update module having means for updating a record in said global code database and means for invoking said distribution means to instruct a distribution target of a transaction processing system to update a local copy of said record in a target database; and a delete module having means for deleting a record from said global code database and means for invoking said distribution means to instruct said distribution target to delete a local copy of said record from said target database.

47. The computer-based system of claim 45, wherein said distribution means comprises:

means for distributing a message to said transaction processing systems, said message including said modified record and instructions for a distribution target in a destination area of a transaction processing system to perform a modification operation on said modified record to modify said local copy of said modified record.

48. A computer-based method for maintaining codes across multiple transaction processing systems, comprising the steps of:

maintaining a master list of record in a global code database;

receiving a code maintenance request from one of the multiple transaction processing systems;

modifying a record in said global code database in response to said code maintenance request; and distributing a local copy of said modified record from said global code database to said one of the multiple transaction processing systems and to any other ones of the multiple transaction processing systems which use said mixed record.

wherein said record is modified in said global code database before said local copy of said modified record is distributed to any of the multiple transaction processing systems.

49. The computer-based of claim 48, wherein said steps of modifying and distributing comprise the steps of:

if said request is to create a record, then
receiving a field value of said record,
creating said record with said field value in said global code database, and
distributing a create message to a distribution target, wherein said create message instructs said distribution target to create a copy of said record with said field value in an associated target database;

if said request is to read a record, then
receiving a query form one of the multiple transaction processing systems,
retrieving said record identified by said query, and
presenting values of said record to said one of the multiple transaction processing systems;

if said request is a request to update a field value of a record, then
receiving an updated field value of said record,
updating said field value with said updated field value in said global code database, and
distributing an update message to a distribution target, wherein said update message instructs said distribution target to update a local copy of said record in an associated target database; and said request is a request to delete a record, then
deleting said record from said global code database, and
distributing a delete message to a distribution target, wherein said delete message instructs an associated target database to delete said local copy of said record from said target database.

* * * * *